United States Patent
Jarjour et al.

(10) Patent No.: US 10,209,101 B2
(45) Date of Patent: Feb. 19, 2019

(54) ROTATION DETECTION APPARATUS

(71) Applicant: RENISHAW PLC, Wotton-under-Edge, Gloucestershire (GB)

(72) Inventors: Anas F Jarjour, Edinburgh (GB); Alan J Holloway, Swindon (GB)

(73) Assignee: RENISHAW PLC, Wotton-under-Edge (GB)

(*) Notice: Subject to any disclaimer, the term of this patent is extended or adjusted under 35 U.S.C. 154(b) by 362 days.

(21) Appl. No.: 14/908,402

(22) PCT Filed: Jul. 31, 2014

(86) PCT No.: PCT/GB2014/052351
§ 371 (c)(1),
(2) Date: Jan. 28, 2016

(87) PCT Pub. No.: WO2015/015213
PCT Pub. Date: Feb. 5, 2015

(65) Prior Publication Data
US 2016/0169710 A1    Jun. 16, 2016

(30) Foreign Application Priority Data

Aug. 1, 2013  (GB) .................................. 1313751.8

(51) Int. Cl.
*G01D 5/34* (2006.01)
*G01B 11/26* (2006.01)

(52) U.S. Cl.
CPC ............. *G01D 5/345* (2013.01); *G01B 11/26* (2013.01)

(58) Field of Classification Search
CPC ............ G01D 5/32; G01D 5/34; G01D 5/344; G01D 5/345; G01B 11/26; G01B 11/27; G01B 11/272
See application file for complete search history.

(56) References Cited

U.S. PATENT DOCUMENTS 3,306,159 A  2/1967 Beall et al.
3,336,832 A  8/1967 Snavely
(Continued)

FOREIGN PATENT DOCUMENTS

CN  1957225 A  5/2007
CN  101715540 A  5/2010
(Continued)

OTHER PUBLICATIONS

Feb. 17, 2017 Office Action issued in Chinese Patent Application No. 201480053405.X.
(Continued)

*Primary Examiner* — John R Lee
(74) *Attorney, Agent, or Firm* — Oliff PLC

(57) ABSTRACT

A rotation detection apparatus, including: a beam source for emitting a beam of polarized light; a decohering arrangement for eliminating or reducing the degree of coherence between first and second independent polarization components of the polarized light to produce a decohered beam of polarized light; a detector for outputting a signal in dependence on the intensity of light incident thereupon, the detector arranged so that the decohered beam of polarized light is incident upon it; a polarizer for location in the path of the decohered beam of polarized light such that rotation of the polarizer relative to the decohered beam of polarized light results in a variation of the intensity of light incident upon the detector from the beam source and a corresponding variation in the signal output from the detector; and a processor for detecting the relative rotation based on the variation of the signal output from the detector.

19 Claims, 7 Drawing Sheets

(56) References Cited

U.S. PATENT DOCUMENTS

| | | | |
|---|---|---|---|
| 3,474,255 A | 10/1969 | White | |
| 3,552,859 A | 1/1971 | Snyder | |
| 3,604,811 A | 9/1971 | McMenmin | |
| 3,723,013 A | 3/1973 | Stirland et al. | |
| 3,871,771 A | 3/1975 | Scott | |
| 3,891,321 A * | 6/1975 | Hock | G01D 5/38 250/237 G |
| 3,932,039 A * | 1/1976 | Frey | G01B 11/26 250/225 |
| 3,938,890 A | 2/1976 | Flavell | |
| 4,536,088 A * | 8/1985 | Rashleigh | G01H 9/004 250/227.19 |
| 4,695,796 A | 9/1987 | Omet et al. | |
| 4,792,228 A | 12/1988 | Haffner | |
| 4,863,274 A | 9/1989 | Spillman, Jr. et al. | |
| 4,867,565 A * | 9/1989 | Lequime | G01K 11/00 356/453 |
| 4,958,929 A | 9/1990 | Kondo | |
| 5,021,647 A * | 6/1991 | Tatsuno | G01D 5/344 250/205 |
| 5,038,029 A * | 8/1991 | Martens | G01D 5/344 250/225 |
| 5,073,025 A | 12/1991 | Brooks | |
| 5,102,222 A * | 4/1992 | Berger | G01J 4/04 356/365 |
| 5,122,660 A * | 6/1992 | Yoshii | G01D 5/38 250/231.16 |
| 5,302,821 A * | 4/1994 | Igaki | G01D 5/344 250/231.16 |
| 5,333,053 A * | 7/1994 | Ishida | G01B 11/272 356/152.1 |
| 5,408,318 A | 4/1995 | Slater | |
| 5,424,535 A | 6/1995 | Albion et al. | |
| 5,517,022 A * | 5/1996 | Bock | G01L 11/025 250/225 |
| 5,596,403 A | 1/1997 | Schiff et al. | |
| 5,815,269 A | 9/1998 | Crabb et al. | |
| 5,900,938 A * | 5/1999 | Huang | G01B 9/02029 356/138 |
| 6,031,613 A | 2/2000 | Washington | |
| 6,049,377 A * | 4/2000 | Lau | G01B 11/26 356/493 |
| 6,609,841 B1 | 8/2003 | Wilde et al. | |
| 6,611,342 B2 * | 8/2003 | Patel | G01D 5/345 356/519 |
| 7,027,162 B2 | 4/2006 | Lau et al. | |
| 7,230,689 B2 | 6/2007 | Lau | |
| 7,352,446 B2 | 4/2008 | Bridges et al. | |
| 7,525,665 B2 | 4/2009 | Lee | |
| 8,345,240 B2 * | 1/2013 | Kemp | G01D 5/345 356/367 |
| 8,368,887 B2 * | 2/2013 | Angood | G01D 5/345 356/364 |
| 8,400,642 B2 | 3/2013 | Nakanishi | |
| 9,046,388 B2 * | 6/2015 | Speidel | G01D 5/3473 |
| 9,335,161 B2 * | 5/2016 | Ohtomo | G01D 5/345 |
| 9,631,954 B2 * | 4/2017 | Mahajan | G01D 5/345 |
| 9,857,161 B2 * | 1/2018 | Feng | G01B 11/002 |
| 2003/0043362 A1 | 3/2003 | Lau | |
| 2003/0106228 A1 | 6/2003 | Fujishima | |
| 2004/0200947 A1 | 10/2004 | Lau | |
| 2005/0078316 A1 * | 4/2005 | Ronnekleiv | G01D 5/35312 356/478 |
| 2005/0128482 A1 * | 6/2005 | Gibbs | G01N 21/19 356/364 |
| 2007/0057668 A1 | 3/2007 | Lee et al. | |
| 2010/0053615 A1 * | 3/2010 | Angood | G01B 11/272 356/364 |
| 2010/0097606 A1 * | 4/2010 | Kemp | G01B 11/272 356/367 |
| 2013/0114087 A1 * | 5/2013 | Deck | G01B 9/0209 356/486 |
| 2016/0169710 A1 * | 6/2016 | Jarjour | G01B 11/26 250/225 |

FOREIGN PATENT DOCUMENTS

| | | |
|---|---|---|
| CN | 101776488 A | 7/2010 |
| CN | 102095438 A | 6/2011 |
| DE | 3405886 A1 | 8/1985 |
| DE | 3803853 A1 | 8/1989 |
| EP | 0345093 A2 | 12/1989 |
| EP | 0468487 A2 | 1/1992 |
| EP | 0936445 A2 | 8/1999 |
| EP | 0936445 B1 | 7/2006 |
| FR | 2868528 A1 | 10/2005 |
| GB | 1428372 A | 3/1976 |
| GB | 1453728 A | 10/1976 |
| GB | 2389896 A | 12/2003 |
| JP | H07-235094 A | 9/1995 |
| JP | 2002-510115 A | 4/2002 |
| JP | 2003-156319 A | 5/2003 |
| WO | 92/21933 A1 | 12/1992 |
| WO | 98/07012 A1 | 2/1998 |
| WO | 02/4890 A1 | 1/2002 |
| WO | 03/019231 A1 | 3/2003 |
| WO | 03/083411 A1 | 10/2003 |
| WO | 2004/102225 A2 | 11/2004 |
| WO | 2008/122808 A2 | 10/2008 |
| WO | 2008/122814 A2 | 10/2008 |
| WO | 2008/122816 A1 | 10/2008 |

OTHER PUBLICATIONS

Jan. 22, 2015 Search Report issued in International Patent Application No. PCT/GB2014/052351.

Jan. 22, 2015 Written Opinion issued in International Patent Application No. PCT/GB2014/052351.

Oct. 9, 2013 Search Report issued in British Patent Application No. 1313751.8.

Jiang, H. et al. "Sensitivity Enhanced Roll Angle Measurement". Optical Engineering, vol. 39, No. 2, pp. 516-519, Feb. 2000.

Ingensand, H. et al. "A High-Accuracy Alignment System Based on the Dispersion Effect". Proceedings of the 5th International Workshop on Accelerator Alignment, Oct. 13-17, 1997.

Ingensand, H. "Concepts and Solutions to Overcome the Refraction Problem in Terrestrial Precision Measurement". Session JS28 Integration of Techniques and Corrections to Achieve Accurate Engineering Survey, Fig XXII International Congress, Washington, D.C., U.S.A., Apr. 19-26, 2002.

Ikeda, K. et al. "Endless Tracking Polarization Controller". Furukawa Review, No. 23, pp. 32-38, 2003.

Apr. 3, 2018 Office Action issued in Japanese Application No. 2016-530612.

May 18, 2018 Search Report issued in European Application No. 17195518.0.

* cited by examiner

ROTATION DETECTION APPARATUS

The present invention relates to a rotation detection apparatus.

A rotation detection apparatus enables relative rotation between two components to be detected. This is useful when it is necessary to know that two components have rotated relative to each other so that subsequent action can be taken. A rotation detection apparatus which enables the degree of rotation to be measured is useful when it is necessary to know by how much the components have rotated relative to each other. For example, such a rotation detection apparatus would be useful in determining the degree of rotation of a moving machine component relative to a stationary machine component as the moving machine component travels along a trajectory. This information enables the machine to be calibrated. In particular, such a rotation detection apparatus could be used to calibrate a co-ordinate positioning apparatus such as a co-ordinate measuring machine (CMM), a machine tool, or a rotating/tilting stage.

A rotation detection apparatus can also be useful in tracking systems, such as systems for accurately tracking the movement of a robot arm, or for instance tracking the movement of a tool mounted on the quill of a CMM.

It is desirable to provide improvements in the precision of a rotation detection apparatus such as that described above.

According to a first aspect of the invention, there is provided a rotation detection apparatus, comprising: a beam source for emitting a beam of polarised light; a decohering arrangement for eliminating or at least reducing the degree of coherence between first and second independent polarisation components of the polarised light to produce a decohered beam of polarised light; a detector for outputting a signal in dependence on the intensity of light which is incident thereupon, the detector being arranged so that the decohered beam of polarised light is incident upon it; a polariser for location in the path of the decohered beam of polarised light such that rotation of the polariser relative to the decohered beam of polarised light results in a variation of the intensity of light incident upon the detector from the beam source and a corresponding variation in the signal output from the detector; and a processor for detecting the relative rotation based on the variation of the signal output from the detector.

The decohered beam of polarised light can alternatively be referred to as a processed beam of polarised light, having been processed by the decohering arrangement to eliminate or at least reduce the degree of coherence between the first and second independent polarisation components of the polarised light.

The beam of polarised light may comprise first and second beam portions having first and second different respective polarisation states, thereby correspondingly providing first and second different output signals from the detector, and wherein the processor is operable to detect the relative rotation based on a difference between the first and second output signals from the detector.

The first and second beam portions may be temporally spaced with respect to one another.

The beam source may comprise first and second different light sources for emitting the first and second beam portions respectively.

The detector may comprise a single detector for providing the first and second different output signals.

The first and second beam portions may have substantially the same wavelength.

The apparatus may comprise means for stabilising the wavelength of the or each light source in the beam source.

The first and second beam portions may have substantially identical profiles and at least an initial common propagation axis toward the polariser.

The footprint of each of the first and second beam portions on the detector may at least partially overlap.

The beam source may comprise a beam conditioner through which the first and second temporally spaced beam portions pass before being emitted from the beam source. The beam conditioner may comprise a fibre optic.

The apparatus may comprise an arrangement for providing first and second different relative orientations between a polarisation axis of the polariser and a polarisation direction of the polarised light, thereby correspondingly providing first and third different output signals from the detector, and wherein the processor is operable to detect the relative rotation based on a difference between the first and third output signals from the detector.

According to a second aspect of the invention, there is provided a rotation detection apparatus, comprising a beam source for emitting a beam of polarised light; a detector for outputting a signal in dependence on the intensity of light which is incident thereupon, the detector being arranged so that the beam of polarised light is incident upon it; a polariser for location in the path of the beam of polarised light such that rotation of the polariser relative to the beam of polarised light results in a variation of the intensity of light incident upon the detector from the beam source and a corresponding variation in the signal output from the detector; and a processor for detecting the relative rotation based on the variation of the signal output from the detector; wherein the beam of polarised light comprises first and second beam portions having first and second different respective polarisation states; wherein the apparatus comprises an arrangement for providing, for each of the first and second beam portions, first and second different relative orientations between a polarisation axis of the polariser and a polarisation direction of the polarised light of that beam portion, thereby correspondingly providing first to fourth different output signals from the detector relating respectively to: (1) the first relative orientation for the first beam portion; (2) the first relative orientation for the second beam portion; (3) the second relative orientation for the first beam portion; and (4) the second relative orientation for the second beam portion; and wherein the processor is operable to detect the relative rotation based on the first to fourth output signals from the detector.

The apparatus may comprise a decohering arrangement for eliminating or at least reducing the degree of coherence between first and second independent polarisation components of the polarised light from the beam source to produce a decohered beam of polarised light that is incident on the detector via the polariser, such that the relative rotation detected by the processor is between the polariser and the decohered beam of polarised light.

The processor may be operable to derive a first value based on a difference between the first and second output signals, to derive a second value based on a difference between the third and fourth output signals, and to detect the relative rotation based on a difference between the first and second values.

The processor may be operable to derive a first value based on a difference between the first and third output signals, to derive a second value based on a difference between the second and fourth output signals, and to detect the relative rotation based on a difference between the first and second values.

The apparatus may comprise a variable gain stage for scaling the output signals and/or the difference values associated with one of the first and second different relative orientations relative to the output signals and/or the difference values associated with other of the first and second different relative orientations.

The polariser may form part of the arrangement for providing the first and second different relative orientations. The polariser may comprise a polarising beam splitter, such as a Wollaston polariser, for providing the first and second different relative orientations.

The arrangement for providing the first and second different relative orientations may comprise a polarising beam splitter.

The arrangement for providing the first and second different relative orientations may comprise a birefringent polariser.

The arrangement for providing the first and second different relative orientations may comprise a Wollaston polariser.

The detector may comprise first and second different detectors for providing the output signals relating respectively to the first and second different relative orientations.

The arrangement for providing the first and second different relative orientations may comprise means for rotating the beam of polarised light to provide the first and second different relative orientations.

A difference between the first and second different relative orientations may be any non-zero value, for example between 1° and 179°, between 5° and 175°, between 15° and 165°, between 45° and 135°, or between 85° and 95°. The difference between the first and second different relative orientations may be substantially 90°.

According to a third aspect of the invention, there is provided a rotation detection apparatus comprising: a beam source for emitting a beam of polarised light; a detector for outputting a signal in dependence on the intensity of light which is incident thereupon, the detector being arranged so that the beam of polarised light is incident upon it; a polariser for location in the path of the beam of polarised light such that rotation of the polariser relative to the beam of polarised light results in a variation of the intensity of light incident upon the detector from the beam source and a corresponding variation in the signal output from the detector; and a processor for detecting the relative rotation based on the variation of the signal output from the detector; wherein the beam of polarised light comprises first and second beam portions having first and second different respective polarisation states, thereby correspondingly providing first and second different output signals from the detector, and wherein the processor is operable to detect the relative rotation based on a difference between the first and second output signals from the detector; and wherein the apparatus comprises a semi-transparent detector arrangement for location in the path of the beam of polarised light before the polariser, such that the first and second beam portions are incident upon the arrangement and at least part of the incident light passes through the arrangement, the arrangement being adapted and arranged to influence the detection of relative rotation by the processor as a substantially linear function of the difference between the intensities of the first and second beam portions, wherein the arrangement is adapted to measure an offset term of the function and to adjust the influence provided by the arrangement to counteract the effect of the offset term, and/or wherein the offset term does not drift significantly with environmental conditions and/or the wavelength of the first and second beam portions.

The arrangement may be adapted to provide a signal which is a substantially linear function of the difference between the intensities of the first and second beam portions, and the signal provided by the arrangement may be arranged to influence the detection of relative rotation by the processor.

The apparatus may comprise a control unit which is operable to control the relative intensities of the first and second beam portions in dependence upon the signal provided by the arrangement. The signal provided by the arrangement is thereby arranged to influence the detection of relative rotation by the processor.

The processor may be operable to detect the relative rotation in dependence upon the signal provided by the arrangement. The signal provided by the arrangement is thereby arranged to influence the detection of relative rotation by the processor.

The decohering arrangement may be configured to provide first and second different optical path lengths for the first and second polarisation components of the polarised light respectively, with a difference between the first and second optical path lengths being greater than a coherence length of the source.

The decohering arrangement may comprise the source, the source being configured to have a coherence length less than a difference between first and second different optical path lengths experienced by the first and second polarisation components of the polarised light respectively.

The decohering arrangement may be configured to provide the first and second polarisation components of the polarised light with first and second different optical path lengths respectively, wherein a phase difference or phase shift between the first and second paths depends on a parameter, and wherein an interference term relating to an interference between the first and second polarisation components averaged over values of the parameter is substantially zero.

The source can be considered as forming part of the decohering arrangement.

The decohering arrangement may comprise a birefringement material, for example in the form of a birefringement crystal, for location in the path of the beam of polarised light.

Any optical components located in the path of the decohered beam of polarised light between the decohering arrangement and the polariser preferably do not introduce substantial drift.

The decohering arrangement may be arranged to introduce a difference in optical path length between the first and second independent polarisation components of the polarised light. The difference in optical path length may be of the order of or larger than the coherence length of the polarised light.

The beam of polarised light emitted from the beam source may be partially or fully polarised.

Detecting the relative rotation by the processor may comprise detecting that relative rotation, by whatever amount, has occurred. This would be the case even when an amount of the relative rotation of the polariser is determined, with respect to any frame of reference, since by determining an amount of the relative rotation it is determined that relative rotation has occurred, at least when that amount is non-zero.

The detecting of the relative rotation by the processor may comprise determining a measure of the relative rotation. For example, the measure may be an absolute angle, or a change in the absolute angle, between the polariser and a fixed frame of reference. The fixed frame of reference may be defined by one or more optical elements in the beam source, for example the polarisation axes of a polarisation maintaining optical fibre or the polarisation axis of a reference polariser. It will be appreciated in this respect that the absolute angle between the polariser and the beam of polarised light incident on the polariser may not be the same as the angle between the polariser and the reference polariser, but the two angles are related in that they change by the same amount when the polariser rotates relative to the beam of polarised light incident upon it, at least when the reference polariser is fixed. The fixed frame of reference may also be defined by the decohering arrangement (such as a birefringent material), if present. The measure need not be an actual angle but may be some other value that depends (in whatever manner) on the actual angle. The measure may be a change in angular orientation from one time to another, rather than an absolute angular orientation.

The relative rotation being detected may be a rotation or a change in angular orientation about an axis that extends parallel to the propagation axis of the beam of polarised light.

Since it is relative rotation that is being detected, one of the polariser and a reference for the relative rotation can be mounted on a moveable part of a machine incorporating such a rotation detection apparatus, with the other being mounted on a fixed part. Alternatively, both can be mounted on different moveable parts of the machine.

It will be appreciated that, where it is stated that a beam is incident upon a particular element, that does not imply that the beam is incident thereupon directly, i.e. without having passed through another optical element. For example, where the beam of polarised light from the beam source (decohered or otherwise) is described as being incident upon the detector, this would be after having passed through the polariser.

It will be appreciated that a detector may comprise a plurality of light sensitive regions having separate respective outputs, with the signal output from the detector being derived from a combination of the outputs of the light sensitive regions. An example of this is a quad cell, having four light sensitive regions having separate respective outputs; the outputs can be combined to produce a single output signal, so that the quad cell acts as a single detector.

When an element is described as being operable to perform, or being for performing, a certain function, if required to distinguish the present invention more clearly from a previously-considered arrangement then that element may be considered to be configured or adapted or arranged to perform that function rather than merely capable of performing that function. For example, where a general purpose processor is used that is controlled by program instructions, the processor may be considered as being configured or adapted or arranged to perform a function when program instructions are actually in place that are suitable for controlling the processor to perform the function during operation.

In general, polarisers can be characterised by a polarisation axis. For planar devices (such as fine wire, dichroic material) this is an axis within the plane of the device. For crystal optics, this is the crystal's optic axis and typically this is oriented to be parallel to the plane of the input window. In known systems which are configured to measure rotation about the propagation axis the polarisation axis is configured such that the polarisation axis is normal to the propagation axis. The polarisation axis is sometimes referred to as a transmission axis, particularly (though not exclusively) in relation to absorptive polarisers (as opposed e.g. to beam-splitting polarisers).

Reference will now be made, by way of example, to the accompanying drawings, in which.

Figure 1:
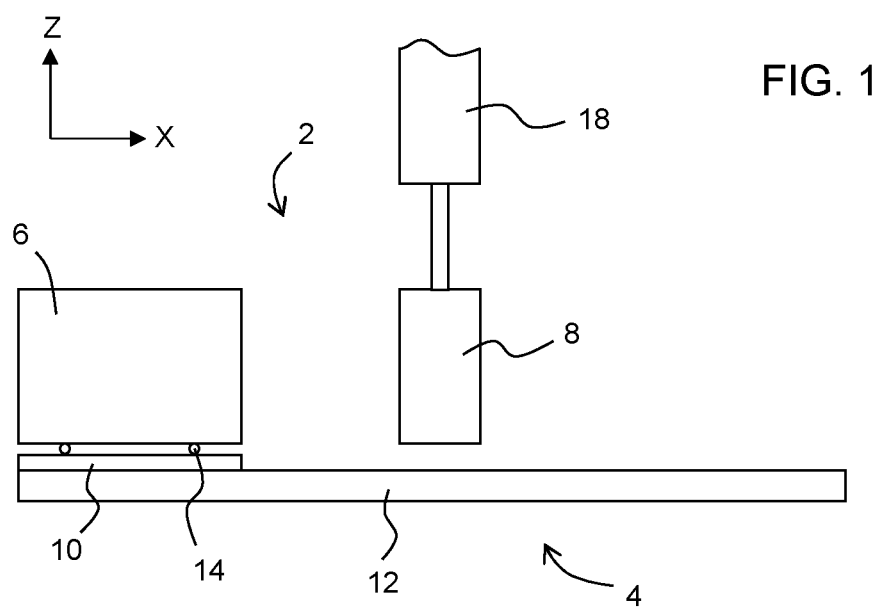
FIG. 1 is a schematic illustration of a rotation detection apparatus mounted on a coordinate measuring machine (CMM)

FIG. 1 illustrates a rotation detection apparatus 2 as mounted on a coordinate measuring machine (CMM) 4. The rotation detection apparatus 2 comprises a beam source (or launch unit) 6 and a receiver unit 8. The beam source 6 is mounted on a machine table 12 of the CMM 4 via a base unit 10 so that they cannot move relative to each other. The receiver unit 8 is mounted on a quill 18 of the CMM 4 so that they cannot move relative to each other. The beam source 6 is operable to emit a beam of light and the receiver unit 8 is arranged relative to the beam source 6 to receive the beam emitted by the beam source 6. The rotation detection apparatus 2 can be used to determine at least one of the relative roll, pitch and yaw between the beam source 6 and the receiver unit 8 about a propagation axis of the beam emitted from the beam source 6 as they move relative to each other along a trajectory.

The beam source 6 and the base unit 10 mounted on the machine table 12 are provided with complementary parts of a kinematic support 14 which enable the beam source 6 to be accurately aligned along any of the X, Y, and Z axes of the CMM or along any other desired direction. Such kinematic supports for aligning optical units are known, for example as disclosed in WO 02/04890.

In use, the receiver unit 8 is moved by the quill 18 along a path approximately parallel to the X axis, and the rotation detection apparatus 2 is used in this example to detect and measure roll between the beam source 6 and receiver 8 about the X axis. Accordingly, the amount of roll about the X axis between the machine table 12 and the quill 18 can be determined and used to calibrate the X axis of the CMM 4. This process can then be repeated to calibrate the Y and Z axes of the CMM 4 by orientating the beam source 6 and receiver 8 accordingly, and moving the quill 18 along the Y and Z axes respectively.

In the example illustrated in FIG. 1, the rotation detection apparatus 2 is mounted on a CMM 4 and is used in the calibration of the CMM 4. However, it will be appreciated that the rotation detection apparatus 2 need not necessarily be mounted on a CMM, and could be used in many different applications in which it is desirable to detect relative rotation between two components.

Figure 2:
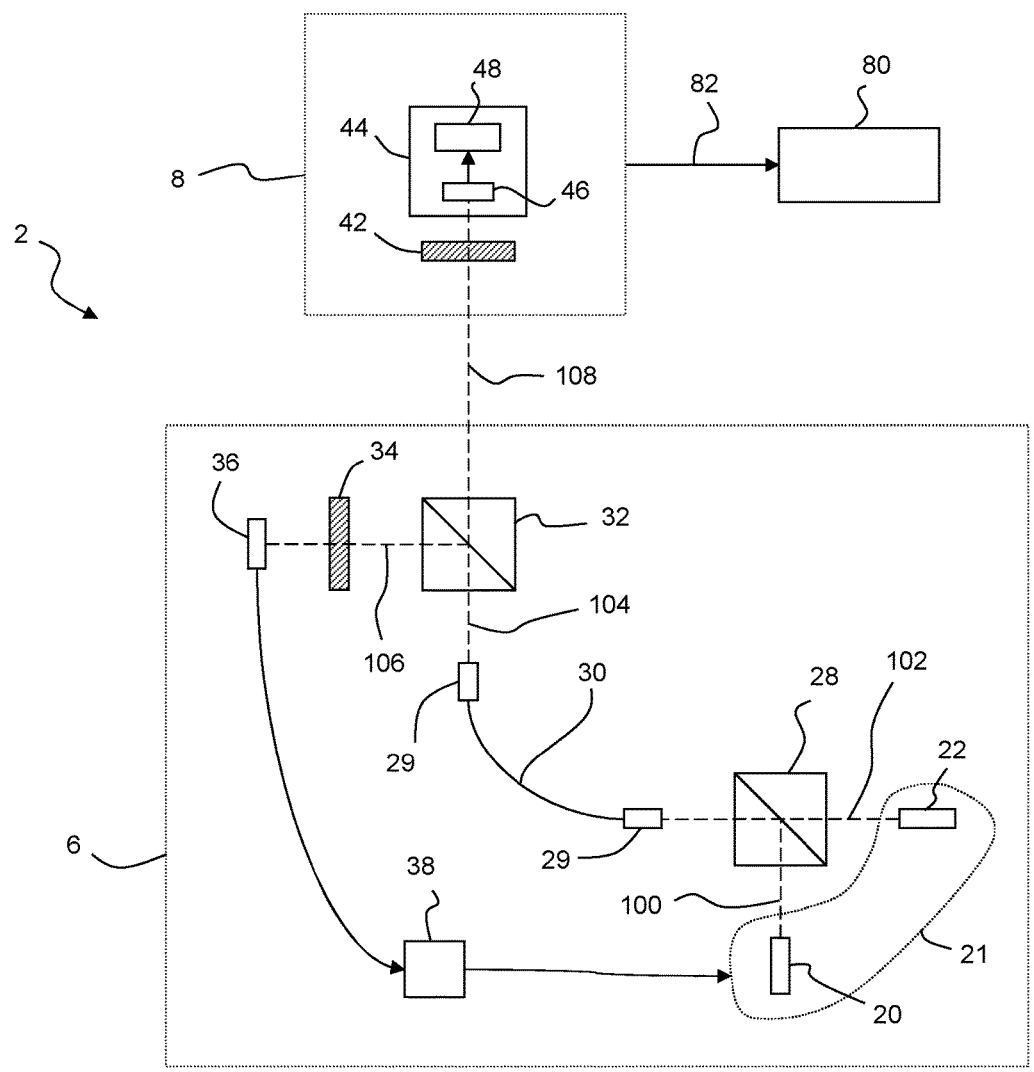
FIG. 2 is a schematic illustration of a known rotation detection apparatus for use in the arrangement shown in FIG. 1.

FIG. 2 illustrates a known rotation detection apparatus 2 which is suitable for use in the setup illustrated in FIG. 1. The rotation detection apparatus 2 illustrated in FIG. 2 is a simplified version of the apparatus 2 shown in FIG. 2 of WO 2008/122808. The rotation detection apparatus 2 is configured to measure relative roll between the beam source 6 and the receiver unit 8 about the propagation axis of the beam emitted by the beam source 6. The beam source 6 comprises first and second light sources 20, 22, a polarising beam splitter 28, a polarisation maintaining optical fibre 30, a non-polarising beam splitter 32, a first polariser 34, a control detector 36, and a control unit 38. The first and second light sources 20, 22 can be considered together as forming a light source 21. Light is coupled into and out of the polarisation maintaining optical fibre 30 by optical coupling elements 29. The components of the beam source 6 are fixed relative to each other.

The first light source 20 is configured to emit a first light beam 100 having a first linear polarisation state and the second light source 22 is configured to emit a second light beam 102 having a second linear polarisation state. The polarising beam splitter 28 is arranged to direct the first and second light beams 100, 102 emitted respectively by the first 20 and second 22 light sources into the polarisation maintaining optical fibre 30. The first and second light sources 20, 22 are arranged such that at least when their respective light beams 100, 102 reach the polarisation maintaining optical fibre 30 their polarisation states are orthogonal to each other.

The polarisation maintaining optical fibre 30 is a single-mode optical fibre having two polarisation axes. The polarisation maintaining optical fibre 30 is arranged so that one of its polarisation axes is aligned with the first polarisation state of the first light beam 100 and so that the other of its polarisation axes is aligned with the second polarisation state of the second light beam 102. Accordingly, the polarisation states of first and second light beams emitted 100, 102 by the first and second light sources 20, 22 are maintained (at least in theory) as they progress through and emerge from the polarisation maintaining optical fibre 30. The polarisation maintaining optical fibre 30 acts to co-align the paths of the first and second light beams 100, 102, so as to produce a spatial overlap between them and so that they at least initially have a common propagation axis when they emerge from the beam source 6.

The non-polarising beam splitter 32 is configured to split a light beam 104 emerging from the polarisation maintaining optical fibre 30 into a control light beam 106 which is directed towards the first polariser 34 and a substantially identical receiver (or measurement) light beam 108 which is directed towards the receiver unit 8.

The first (or reference) polariser 34 is arranged so that its polarisation axis is at an angle of approximately 45° to both the first and second polarisation states of the control light beam 106 (i.e. at an angle of approximately 45° to the axes of the polarisation maintaining optical fibre 30). The control detector 36 is configured to detect the intensity of light passing through the first polariser 34 and to output the detected intensity to the control unit 38. The term 'detector' used herein is intended to mean a light detector, that is to say a detector for measuring the intensity of light which is incident upon the detector. The control unit 38 is configured to control the power of the first and second light sources 20, 22 based on the detected intensity from the control detector 36. This is so as to avoid undesired fluctuations in intensity and/or polarisation from the first and second light sources 20, 22 which would otherwise affect the determination of rotation.

The receiver unit 8 comprises a second (or measurement) polariser 42 and a detector unit 44 comprising a receiver detector 46 and a processor 48. The second polariser 42 is substantially the same as the first polariser 34, oriented in substantially the same orientation as the first polariser 34. The second polariser 42 is mounted within the receiver unit 8 such that when the receiver unit 8 and the beam source 6 are aligned (so that there is no roll, pitch or yaw between them) the polarisation axis of the second polariser 42 is at a 45° angle to both the first and second linear polarisation states of the receiver light beam 108.

The receiver detector 46 is substantially identical to the control detector 36 and is configured to detect the intensity of light passing through the second polariser 42 and to output the detected intensity to the processor 48. The processor 48 is configured to analyse the detected intensity over a period of time and to provide an output indicative of the amount of roll between the beam source 6 and the receiver unit 8 about the X axis.

The receiver unit 8 is connected to a computer 80 by a communications link 82, such as a wireless communications link. The computer 80 has a display (not shown) via which a reading indicating the degree of roll between the beam source 6 and the receiver unit 8 can be provided to a user.

In use, the control unit 38 receives a clock signal from a timing unit (not shown). The control unit 38 uses the clock signal to power the first and second light sources 20, 22 alternately so that they alternately emit the first and second light beams 100, 102 at a predetermined frequency, which form first and second portions of the receiver light beam 108 which is incident upon the receiver detector 46.

As the receiver light beam 108 passes through the second polariser 42, it is resolved into two orthogonal vector components, one of which is parallel to the polarisation axis of the second polariser 42 ("the parallel component"), and the other of which is perpendicular to the polarisation axis. The parallel components of each of the first and second portions of the receiver light beam 108 pass through the second polariser 42 and their intensities are detected by the receiver detector 46. The receiver detector 46 outputs a signal, indicative of the detected intensities, which is fed to the processor 48 which analyses the detected intensities and outputs a signal indicative of the extent of roll between the beam source 6 and the receiver unit 8.

The apparatus is configured such that when the beam source 6 and the receiver unit 8 are aligned, the intensity of the parallel components of each of the first and second portions of the receiver light beam 108 received at the receiver detector 46 will be substantially the same. In contrast, when the beam source 6 and the receiver unit 8 are not aligned, the magnitude of the parallel component of one of the first and second portions of the receiver light beam 108 reaching the receiver detector 46 will be greater than the other. This is because, when there is a degree of roll between the beam source 6 and the receiver unit 8, the polarisation axis of the second polariser 42 will no longer be at 45° to the polarisation states of the first and second portions (and the angle between the first polariser 34 and the second polariser 42 will change). The parallel component of the portion of the receiver light beam 108 which has a smaller angle between its polarisation state and the polarisation axis will be larger than that of the other portion of the light beam. Accordingly, the detected intensity of one of the first and second portions of the receiver light beam detected by the receiver detector 46 will be greater than the other.

Accordingly, the difference in the detected intensity of the first portion of the receiver light beam 108 and the detected intensity of the second portion of the receiver light beam 108 is proportional to the degree of roll between the beam source 6 and the receiver unit 8 (at least over a small angle of roll). It is therefore possible for the processor 48 to determine the degree of roll based on that difference.

Furthermore, as the beam source 6 and receiver unit 8 move along their trajectory, any rotation between them will cause a change in the detected intensities of the first and second portions of the receiver light beam 108. Accordingly, roll between the beam source 6 and the receiver unit 8 can be actively determined during movement along a trajectory by monitoring for changes in the detected intensities.

Further detail of the operation and configuration of the known rotation detection apparatus can be found in WO 2008/122808, the content of which is hereby incorporated by reference. The reader is also referred to WO 92/21933, the content of which is also hereby incorporated by reference.

As described above with reference to FIG. 2, with the rotation detection apparatus disclosed in WO 2008/122808, two light sources 20, 22 are combined in the beam source 6 and coupled to the polarisation maintaining optical fibre 30, the polarisation maintaining optical fibre 30 having first and second orthogonal polarisation axes. Ideally, the first source 20 has a linear polarisation which is perfectly coupled to the first axis of the polarisation maintaining optical fibre 30 and the second source 22 has a linear polarisation which is perfectly coupled to the second (orthogonal) axis of the polarisation maintaining optical fibre 30.

In practice, the first portion of the light beam 104 emerging from the polarisation maintaining optical fibre 30 (i.e. that derived from the first source 20) will have a main component along the first axis of the polarisation maintaining optical fibre and a small component along the second axis. Likewise, the second portion of the light beam 104 emerging from the polarisation maintaining optical fibre 30 (i.e. that derived from the second source 22) will have a main component along the second axis of the polarisation maintaining optical fibre 30 and a small component along the first axis. It can be considered that there is 'leakage' from one axis of the polarisation maintaining optical fibre 30 to the other. What is more, the 'leakage' component may not have the same phase as the main component, so that the polarisation of the light emerging from the polarisation maintaining optical fibre 30 will in general be elliptical. This slight coupling or 'leakage' between the two axes of the polarisation maintaining optical fibre 30 is usually referred to as 'polarisation mode coupling'.

It is not only the polarisation mode coupling of the polarisation maintaining optical fibre 30 that will contribute to non-ideal behaviour. All of the optical components in the beam source 6 have the potential to contribute. Other examples are the limited extinction ratio of the light sources 20, 22, the non-ideal behaviour of the combining optics (such as the limited extinction ratio of the polarising beam splitter 28), and the alignment tolerance of the polarisation maintaining optical fibre 30.

In addition, the non-polarising beam splitter 32 in the beam source 6 is in practice not ideal. For example, the split ratio between reflection and transmission will be different to some extent for different polarisations and will depend to some extent on the wavelength of the source and temperature of the optic. A phase shift will also be introduced between the 's' and 'p' components of the non-polarising beam splitter 32, which phase shift will be different to some extent for reflection and transmission and which will also depend to some extent on the wavelength. The first and second polarisers 34, 42 will also not be identical in their transmission properties.

In addition, the temperature of the light sources 20, 22 will change over time, for example as they warm up or due to general changes in ambient conditions, which will lead to changes in the wavelength of the two sources 20, 22. The temperature of the polarisation maintaining optical fibre 30 is also likely to change, which will lead to variations in the phase shift introduced by the polarisation maintaining optical fibre 30 between the two polarisation components.

The present applicant has appreciated that all of the above-described non-ideal behaviours (and possibly others) result in the roll signal from the detector unit 44 exhibiting variations with time even when the beam source 6 (launch unit) and the receiver unit 8 are static. This is referred to as rotation (or roll) drift, and the present applicant has appreciated the desirability of providing a rotation detection apparatus which accounts for this.

Two main changes to the rotation detection apparatus of WO 2008/122808 are proposed herein to address the above issues identified by the present applicant. To gain an understanding of the nature of the proposed changes, and how they are effective in addressing the above issues, a more detailed explanation of the theory underlying the rotation detection apparatus of WO 2008/122808 will first be provided, to gain an understanding of why the undesirable drifts occur, followed by an explanation of how an embodiment of the present invention seeks to eliminate or at least reduce the effects of the drifts. This explanation is to be understood as being part of the inventive contribution made by the present applicant.

Consider for the moment just the first portion of the receiver light beam 108 which emerges from the beam source 6 and which is incident upon the receiver detector 46 via the second polariser 42 (i.e. that portion derived from the first source 20). As illustrated schematically in FIG. 3, the first portion has a main polarisation (electric field) component $E_a$ along an axis 'a' and a secondary (smaller) polarisation (electric field) component $E_b$ along an orthogonal axis 'b'. The main and secondary polarisation components can be considered as first and second independent polarisation components of the polarised light of the receiver light beam 108.

Axes 'a' and 'b' are defined by the combination of components along the optical path in the beam source 6, and need not correspond with physical axes of any single component, such as the polarisation axes of the polarisation maintaining optical fibre 30. In fact, since the polarisation of light can be decomposed or resolved along any two axes, the axes 'a' and 'b' can be considered as "decomposition axes" and need not correspond to any physical axes of the system, and indeed need not be orthogonal to one another in the sense that any two dimensional vector can be written as the sum of at least two non-parallel vectors.

For simplicity and without loss of generalisation, we consider them orthogonal in what follows.

Because of the phase shifts introduced by the polarisation maintaining optical fibre 30 and the other optics in the beam source 6 (as explained above), the smaller component $E_b$ along axis 'b' will in general have a phase shift $\varphi$ relative to the main component $E_a$ along axis 'a' (it is elliptically polarised), and the smaller component can therefore be represented as $E_b e^{i\varphi}$.

A polarisation axis 43 of the second polariser 42 (in the receiver unit 8) is oriented at an angle θ to the 'a' axis (which axis, as explained above, is defined by the components in the beam source 6). It is the angle θ which changes as the receiver unit 8 rotates (with the second polariser 42 inside), and it is the angle θ ultimately is what is to be measured (or at least some quantity that is dependent upon θ). It is the phase shift φ which contributes in part to the roll drift, as will be seen in more detail below.

Figure 3:
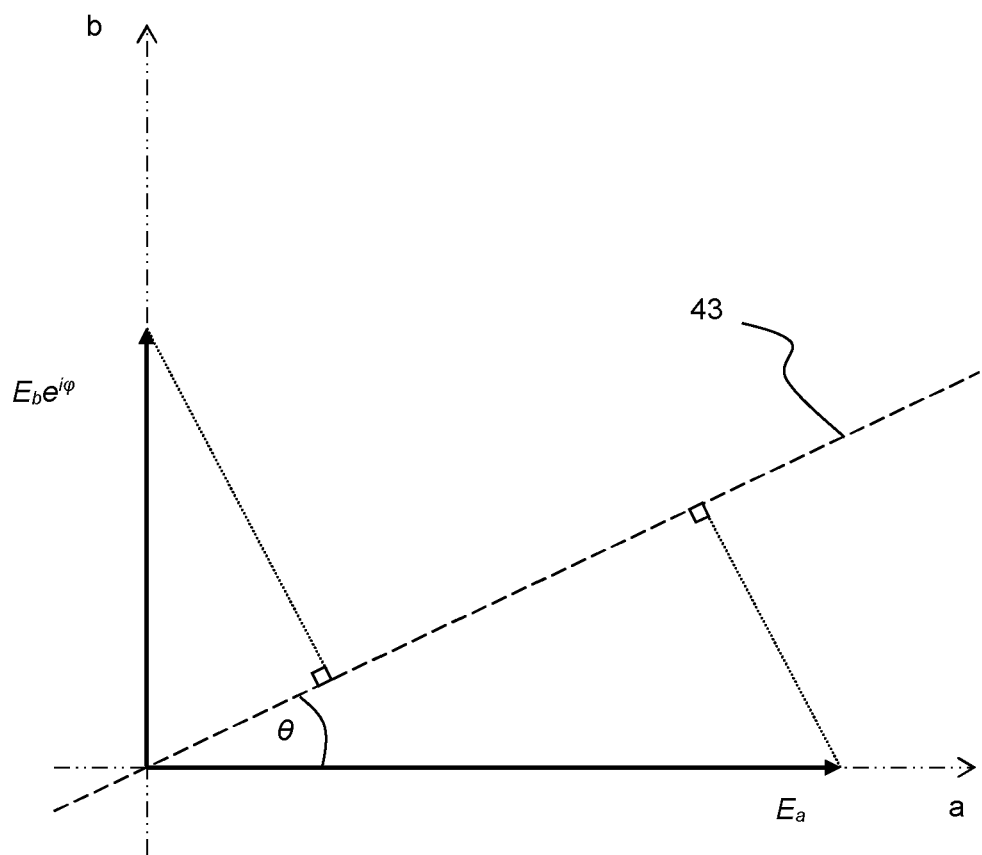
FIG. 3 is a schematic illustration used to explain issues with the known rotation detection apparatus, and how an embodiment of the present invention sets out to address those issues.

The amplitude of light that passes through the second polariser 42 will be the sum of the main and smaller components as projected (as illustrated in FIG. 3) onto the polarisation axis 43 of the second polariser 42:

$$E = E_a \cos\theta + E_b e^{i\varphi} \sin\theta. \tag{1}$$

The intensity (i.e. what the receiver detector 46 actually senses) is:

$$I = EE^* \text{ (where } E^* \text{ is the complex conjugate of } E) \tag{2}$$

$$= (E_a \cos\theta + E_b e^{i\varphi} \sin\theta)(E_a \cos\theta + E_b e^{-i\varphi} \sin\theta) \tag{3}$$

$$= E_a^2 \cos^2\theta + E_b^2 \sin^2\theta + E_a \cos\theta E_b \sin\theta (e^{i\varphi} + e^{-i\varphi}) \tag{4}$$

$$= E_a^2 \cos^2\theta + E_b^2 \sin^2\theta + (2 E_a \cos\theta E_b \sin\theta) \cos\varphi \tag{5}$$

A simplification can be made by substituting the following expressions:

$$I_a = E_a^2 \tag{6}$$

$$I_b = E_b^2 \tag{7}$$

$$f(\theta, \varphi) = (2 E_a \cos\theta E_b \sin\theta) \cos\varphi = (E_a E_b \sin 2\theta) \cos\varphi \tag{8}$$

into expression (5) to give:

$$I = I_a \cos^2\theta + I_b \sin^2\theta + f(\theta, \varphi) \tag{9}$$

It is also possible to relate $I_a$ to $I_b$ to each other as follows:

$$I_b = \alpha_1 I_1 \tag{10}$$

$$I_a = (1 - \alpha_1) I_1 \tag{11}$$

where $I_1$ is the total intensity of the first portion of the receiver light beam 108 which emerges from the beam source 6 (i.e. that derived from the first source 20), before passing through the second polariser 42, and where $\alpha_1$ characterises the small amount of leakage between the two components for the first source 20.

Substituting expressions (10) and (11) into expression (9), and replacing $f(\theta, \varphi)$ with $f_1(\theta, \varphi_1)$ to denote it as being specific to the first source 20, the following expression is obtained for the variation of the intensity $I_1(\theta, \varphi_1)$ of the first portion of the receiver light beam 108 which emerges from the beam source 6:

$$I_1(\theta, \varphi_1) = (1 - \alpha_1) I_1 \cos^2\theta + \alpha_1 I_1 \sin^2\theta + f_1(\theta, \varphi_1) \tag{12}$$

$$= -\alpha_1 I_1 (\cos^2\theta - \sin^2\theta) + I_1 \cos^2\theta + f_1(\theta, \varphi_1) \tag{13}$$

$$= -\alpha_1 I_1 (\cos 2\theta) + \frac{1}{2} I_1 (1 + \cos 2\theta) + f_1(\theta, \varphi_1) \tag{14}$$

$$= \frac{1}{2} I_1 + \left(\frac{1}{2} I_1 - \alpha_1 I_1\right) \cos 2\theta + f_1(\theta, \varphi_1) \tag{15}$$

$$\propto I_1 + (I_1 - 2\alpha_1 I_1) \cos 2\theta + f_1'(\theta, \varphi_1) \tag{16}$$

where $f_1'(\theta, \varphi_1) = 2 f_1(\theta, \varphi_1)$.

An equivalent expression can be derived, in an entirely equivalent way, for the variation of the intensity $I_2(\theta, \varphi_2)$ of the second portion of the receiver light beam 108 which emerges from the beam source 6 (derived from the second source 22).

Since, for the second source 22, the main component is aligned along the 'b' axis of FIG. 3, with $E_b$ being larger than $E_a$, expressions (10) and (11) above become:

$$I_a = \alpha_2 I_2 \tag{17}$$

$$I_b = (1 - \alpha_2) I_2 \tag{18}$$

Substituting expressions (17) and (18) into expression (9), and replacing $f(\theta, \varphi)$ with $f_2(\theta, \varphi_2)$ to denote it as being specific to the second source 22, the following expression is obtained for the variation of the intensity $I_2(\theta, \varphi_2)$:

$$I_1(\theta, \varphi_1) = \alpha_2 I_2 \cos^2\theta + (1 - \alpha_2) I_2 \sin^2\theta + f_2(\theta, \varphi_2) \tag{19}$$

$$= \alpha_2 I_2 (\cos^2\theta - \sin^2\theta) + I_2 \sin^2\theta + f_2(\theta, \varphi_2) \tag{20}$$

$$= \alpha_2 I_2 (\cos 2\theta) + \frac{1}{2} I_2 (1 - \cos 2\theta) + f_2(\theta, \varphi_2) \tag{21}$$

$$= \frac{1}{2} I_2 + \left(\alpha_2 I_2 - \frac{1}{2} I_2\right) \cos 2\theta + f_2(\theta, \varphi_2) \tag{22}$$

$$\propto I_2 + (2\alpha_2 I_2 - I_2) \cos 2\theta + f_2'(\theta, \varphi_2) \tag{23}$$

where $f_2'(\theta, \varphi_1) = 2 f_2(\theta, \varphi_1)$.

Although it is stated above that the main polarisation component of the second source 22 is aligned along the 'b' axis of FIG. 3, and is therefore orthogonal to the main polarisation component of the first source 20 (which is aligned along the 'a' axis of FIG. 3), this is for ease of explanation and illustration and need not necessarily be the case in practice. Whatever the polarisation of the second source 22, it would still have respective components decomposed or resolved along the 'a' and 'b' axes (which, as mentioned above are merely decomposition axes), so the above theory still applies.

As described above with reference to FIG. 2, and as explained in more detail in WO 2008/122808, based on signals from the receiver detector 46, the processor 48 (which is referred to in WO 2008/122808 as a roll determinator) computes the difference between the detected intensity of the first portion of the receiver light beam 108 and the detected intensity of the second portion of the receiver light beam 108.

This amounts to expression (16) minus expression (23), giving the following expression for the roll signal S, which is the signal determined by the processor 48:

$$S = (I_1 - I_2) + (I_1 + I_2 - 2\alpha_1 I_1 - 2\alpha_2 I_2) \cos 2\theta + (f_1'(\theta, \varphi_1) - f_2'(\theta, \varphi_2)) \tag{24}$$

The benefit in taking a difference in this way is that any factors (such as temperature) that might affect $I_1$ will affect $I_2$ in substantially the same way, so that the difference between the two will substantially cancel those effects; in this respect, by forming the difference, $I_1$ from expression (16) has been replaced by $(I_1 - I_2)$ in expression (24). It will be appreciated that it is possible, even if not desirable, to derive a roll signal using a single source, without taking such a difference, i.e. based on expression (16) alone.

Expression (24) can be simplified slightly by inserting the following:

$$f(\theta,\varphi_1,\varphi_2) = f_1'(\theta,\varphi_1) - f_2'(\theta,\varphi_2) \quad (25)$$

into expression (24) to give:

$$S = (I_1 - I_2) + f(\theta,\varphi_1,\varphi_2) + (I_1 + I_2 - 2\alpha_1 I_1 - 2\alpha_2 I_2)\cos 2\theta \quad (26)$$

The above roll signal S of expression (26) can be considered as being composed of three contributions:

$$S = Z + P + R \quad (27)$$

where:

$$Z = (I_1 - I_2) \text{ ('zero point')} \quad (28)$$

$$P = f(\theta,\varphi_1,\varphi_2) = f_1'(\theta,\varphi_1) - f_2'(\theta,\varphi_2) \text{ ('phase shifts')} \quad (29)$$

$$R = (I_1 + I_2 - 2\alpha_1 I_1 - 2\alpha_2 I_2)\cos 2\theta \text{ ('roll')} \quad (30)$$

As can be seen from the above expression (28), the 'zero point' term is due to the difference between the intensities of the first and second portions of the receiver light beam 108 (derived respectively from the two light sources 20, 22) just before the polariser 42 at the receiver unit 8.

As can be seen from the above expression (29), the 'phase shifts' term is due to the fact that, in reality, the polarisation of the first and second portions of the receiver light beam 108 launched from the beam source 6 is elliptic in general, being a function of $\varphi_1$ and $\varphi_2$. As described above, this is due to the phase shifts introduced by the polarisation maintaining optical fibre 29 and the other optics in the beam source 6.

As can be seen from the above expression (30), at least when $\theta$ is at 45°, the "roll" term is roughly proportional to the roll $\theta$ of the receiver unit 8 with respect to some fixed non-drifting reference in the beam source 6 (i.e. the axis 'a' defined above). This is because, when $\theta$ is at 45°, cos 2$\theta$ is in its linear region to the first order. To demonstrate this, consider a variation $\Delta\theta$ of the roll from an initial value $\theta_0$, so that expression (30) becomes:

$$R = (I_1 + I_2 - 2\alpha_1 I_1 - 2\alpha_2 I_2)\cos(2\theta_0 + 2\Delta\theta) \quad (30\text{-a})$$

Expanding the cosine to the first order gives:

$$R = (I_1 + I_2 - 2\alpha_1 I_1 - 2\alpha_2 I_2)[\cos 2\theta_0 + 2\Delta\theta \sin 2\theta_0] \quad (30\text{-b})$$

As can be seen from expression (30-b), when $\theta_0$ is 45° the offset cos 2$\theta_0$ is zero and the scale sin 2$\theta_0$ is 1, and the "roll" term R is roughly proportional to variations $\Delta\theta$ in the roll. The coefficient of proportionality between the electronic roll signal and the real physical roll signal is called the roll scale. As can be seen from expression (30-b) above, the roll scale is proportional to $(I_1 + I_2 - 2\alpha_1 I_1 - 2\alpha_2 I_2)$.

However, it will be appreciated that even if $\theta_0$ is not 45°, variations of roll can still be measured provided that the offset term $(I_1 + I_2 - 2\alpha_1 I_1 - 2\alpha_2 I_2)[\cos 2\theta_0]$ does not drift more than is tolerable. In practice it is preferred to be very close to 45° because of the drifts in the roll scale which is proportional to $(I_1 + I_2 - 2\alpha_1 I_1 - 2\alpha_2 I_2)$. Note also that one may extend the range of measurement by expanding to higher orders and calibrating. Typically, an expansion to the first order, as shown above, would be sufficient at least up to roll variations $\Delta\theta$ of ±1000 gad, but no limitation of the invention is implied by that range because accuracy requirements will vary from one application to another.

The present applicant has identified that the 'zero point' term (28) and the 'phase shifts' term (29) are the main sources of the drift in the rotation detection apparatus. The roll scale may drift but this is less of an issue as it would give a scale error which can be tolerated, because this would be proportional to (a small percentage of) what is being measured rather than something comparable to what is being measured.

To combat these drifts, two main changes are proposed to the rotation detection apparatus of WO 2008/122808.

The first change is aimed at combating the drift caused by the 'phase shifts' term (29).

Looking back at expression (8), it can be seen that the 'phase shifts' term (29) is ultimately a function of cos $\varphi$, where $\varphi$ is the phase difference between the two orthogonal polarisation components depicted in FIG. 3 (and which may differ between sources). This is basically an interference term, resulting from interference between the two out-of-phase orthogonal components of the elliptically polarised light.

The present applicant has appreciated that this interference term is only an issue when the two orthogonal components are coherent or at least partially coherent with one another, so that $\varphi$ is constant or varies slightly. When there is no coherence between the two components, $\varphi$ takes a range of values and the weighted average of the interference term over these value is zero, negligibly small or reduced.

An embodiment of the present invention therefore introduces a 'decohering' or 'scrambling' element, with the purpose of eliminating the coherence between the two orthogonal polarisation components (or at least reducing the coherence, since some advantage would be obtained even if the coherence is not entirely eliminated, but merely reduced).

The decohering element not only ensures that the phase terms are zero (or at least reduced) but it also has the advantage of providing a mechanical reference against which the roll is measured. Without it, the orientation of the axes 'a' and 'b' of FIG. 3 are not well defined (not stable and/or not fixed).

The second change is aimed at combating the drift caused by the 'zero point' term (28). This change can either be used in combination with the first change, or independently of the first change.

Consider a first roll signal $S_A$ which is determined with the polarisation axis 43 of the second polariser 42 (in the receiver unit 8) at angle of $\theta$ as before, so that $S_A$ is given by expression (26) as follows:

$$S_A = (I_1 - I_2) + P_A + (I_1 + I_2 - 2\alpha_2 I_2)\cos 2\theta \quad (31)$$

where $P_A$ is the abbreviation for the phase shifts term used in expressions (27) and (29).

Now consider a second roll signal $S_B$ which is produced when the polarisation axis 43 of the second polariser 42 (in the receiver unit 8) is rotated by 90° from $\theta$, so that $\theta$ in expression (31) becomes $\theta + \pi/2$:

$$S_B = (I_1 - I_2) - P_B + (I_1 + I_2 - 2\alpha_1 I_1 - 2\alpha_2 I_2)\cos(2\theta + \pi) \quad (32)$$

$$= (I_1 - I_2) - P_B - (I_1 + I_2 - 2\alpha_1 I_1 - 2\alpha_2 I_2)\cos(2\theta) \quad (33)$$

It can be seen that the main change is to switch the sign of the "roll" term from positive to negative. The sign of the phase term $P_B$ is also shown as having switched, since it is derived ultimately from expression (8) which has a sin 2$\theta$ term in it, and $\sin(2\theta + \pi) = -\sin(2\theta + \pi)$.

Therefore the changes introduced to derive the second roll signal $S_B$ from the first roll signal $S_A$ is to go from:

$$S_A=Z+P_A+R \quad (34)$$

to:

$$S_B=Z-P_B-R \quad (35)$$

Now, forming the difference between $S_A$ from expression (34) and $S_B$ from expression (35) gives:

$$S_A-S_B=(P_A+P_B)+2R \quad (36)$$

The fuller expression for the difference, i.e. the difference between $S_A$ from expression (31) and $S_B$ from expression (33), is:

$$S_A-S_B=(P_A+P_B)+2(I_1+I_2-2\alpha_1 I_1-2\alpha_2 I_2)\cos 2\theta \quad (37)$$

The 'zero point' term Z has thus been eliminated. This is because the zero point term (Z) is common to both $S_A$ and $S_B$ whereas the roll signal (R) is differential. Thus by subtracting the signals $S_A$ and $S_B$, the roll signal is obtained without the zero point drift. Note, however, that the roll scale (the term in front of cos 2θ) would still vary slightly due to variations in the extinction ratios and the intensities.

Now consider when the second change is used in combination with the first change. Implementation of the first change would have the effect of eliminating both 'phase shifts' terms $P_A$ and $P_B$ from expression (37), to give:

$$S_A-S_B=2(I_1+I_2-2\alpha_1 I_1-2\alpha_2 I_2)\cos 2\theta \quad (38)$$

Thus both the 'zero point' term and the 'phase shifts' term have been eliminated, leaving just the 'roll' term.

The analysis presented above relating to the second change, starting with expression (31), was based on expression (26), i.e. with two sources 20, 22. It will be appreciated that a similar analysis would also apply starting from expression (16), i.e. based on a single source. The use of two sources is preferable for the same reasons stated above following expression (24).

It will also be appreciated that, starting from expression (31), a similar analysis can also be performed in which the second roll signal $S_B$ is derived based on a rotation of the polarisation axis 43 of the second polariser 42 (in the receiver unit 8) by an angle other than 90° from θ. Expression (31) is repeated as follows:

$$S_A=(I_1-I_2)+P_A+(I_1+I_2-2\alpha_1 I_1-2\alpha_2 I_2)\cos 2\theta \quad (31)$$

Now consider a second roll signal $S_B$ which is produced when the polarisation axis 43 of the second polariser 42 (in the receiver unit 8) is rotated by angle 2γ from θ, so that θ in expression (31) becomes θ+2γ:

$$S_B=(I_1-I_2)+P_B+(I_1+I_2-2\alpha_1 I_1-2\alpha_2 I_2)\cos(2\theta+4\gamma) \quad (39)$$

Now if we measure small angular deviations Δθ from −γ (which is the bisector of the two polarizer axes), we replace θ by Δθ−γ:

$$S_A=(I_1-I_2)+P_A+(I_1+I_2-2\alpha_1 I_1-2\alpha_2 I_2)\cos(2\Delta\theta-2\gamma) \quad (40)$$

$$S_B=(I_1-I_2)+P_B+(I_1+I_2-2\alpha_1 I_1-2\alpha_2 I_2)\cos(2\Delta\theta+2\gamma) \quad (41)$$

Expanding to the first order in Δθ, we get:

$$\cos(2\Delta\theta-2\gamma)=\cos(-2\gamma)-(2\Delta\theta)\sin(-2\gamma) \quad (42)$$
$$=\cos(2\gamma)+(2\Delta\theta)\sin(2\gamma)$$

$$\cos(2\Delta\theta+2\gamma)=\cos(2\gamma)-(2\Delta\theta)\sin(2\gamma) \quad (43)$$

And thus we have:

$$S_A=Z+P_A+R \quad (44)$$

$$S_B=Z-P_B-R \quad (45)$$

where $$Z=(I_1-I_2)+(I_1+I_2-2\alpha_1 I_1-2\alpha_2 I_2)\cos(2\gamma) \quad (46)$$

and $$R=2(I_1+I_2-2\alpha_1 I_1-2\alpha_2 I_2)\sin(2\gamma)\Delta\theta \quad (47)$$

It can be seen that the only real change in rotating the polarisation axis 43 of the second polariser 42 (in the receiver unit 8) by an angle other than 90° from θ is a reduced sensitivity, due to the factor sin(2γ). It can also be seen that the maximum signal sensitivity (maximum roll scale) is obtained for 2γ=π/2. One may also extend the range of measurement to higher orders and calibrate the roll signal; in fact another way of finding this is by noting that:

$$\cos(2\Delta\theta-2\gamma)-\cos(2\Delta\theta+2\gamma)=-2\sin(-2\gamma)\sin(2\Delta\theta) \quad (48)$$

And thus the difference is given exactly by:

$$S_A-S_B=P_A-P_B+2(I_1+I_2-2\alpha_1 I_1-2\alpha_2 I_2)\sin(2\gamma)\sin(2\Delta\theta) \quad (49)$$

The second change, which is effectively to rotate the second polariser 42 (in the receiver unit 8) by 90° to derive a second signal $S_B$ which is subtracted from the first signal $S_A$, could be implemented in at least the following two ways.

The two different approaches to implementing the second change are based on an appreciation that the 90° rotation of the polarisation axis 43 of the second polariser 42 to derive the second signal $S_B$, as mentioned above in connection with expression (33), is actually a relative rotation that can either be achieved by having a suitable arrangement in the beam source 6 to provide the relative rotation between a polarisation axis of the polariser and a polarisation direction of the polarised light (first approach), or by having a suitable arrangement in the receiver unit 8 to provide the relative rotation between a polarisation axis of the polariser and a polarisation direction of the polarised light (second approach).

The first approach to implementing the second change would therefore be to have a single detector unit 44 in the receiver unit 8 as per WO 2008/122808 (determining the difference between the signals from the two light sources 20, 22), with an arrangement in the beam source 6 which alternatively rotate the polarisations of both light sources 20, 22 by 90°. Processing electronics in the receiver unit 8 would then form the difference between alternate difference readings from the single detector unit 44.

The second approach to implementing the second change would therefore be to have (for example) a polarising beam splitter in the receiver unit 8 and two such detector units 44 at the two respective output ports of the beam splitter (each detector unit 44 determining the difference between the signals from the two light sources 20, 22 as per WO 2008/122808). The two detector units 44 would thereby respectively provide the two roll signals relating to the two polarisation axis orientations θ and (θ+90°), with processing electronics in the receiver unit 8 to form the difference between the roll signals from the two detector units 44.

Figure 4:
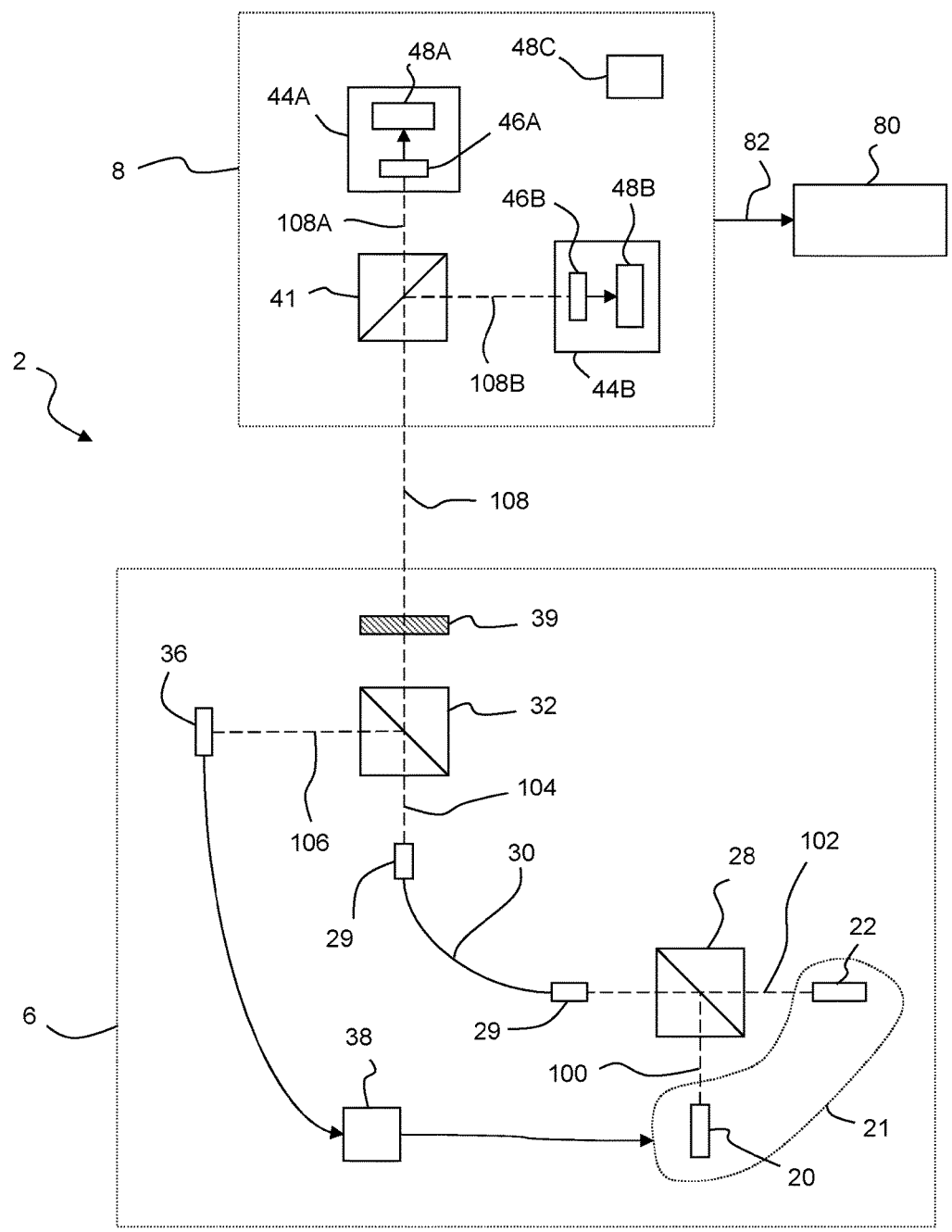
FIG. 4 is a schematic illustration of a rotation detection apparatus according to an embodiment of the present invention, for use for example in the arrangement shown in FIG. 1.

FIG. 4 is a schematic illustration of a rotation detection apparatus 2 embodying the present invention which is based on the above-mentioned second approach to implementing the second change, and which also incorporates the above-mentioned first change. Apart from differences relating to the first and second changes, the apparatus of FIG. 4 is otherwise largely the same as that described above with reference to FIG. 2, and a description will be provided here of only those aspects of the apparatus that differ from the previous scheme.

With the rotation detection apparatus 2 of FIG. 4, the receiver unit 8 comprises first and second detector units 44A, 44B, with each detector unit 44A, 44B corresponding generally to the detector unit 44 of FIG. 2. Therefore, the first detector unit 44A comprises a first receiver detector 46A and a first processor 48A, while the second detector unit 44B comprises a second receiver detector 46B and a second processor 48B. A third processor 48C is provided, which is arranged to receive respective signals from the first and second processors 48A, 48B, and to output a signal to the computer 80 over communications link 82.

In order to implement the second change mentioned above, a Wollaston polariser (or prism) 41 is provided in FIG. 4 in place of the second (receiver) polariser 42 of FIG. 2. The Wollaston polariser 41 is adapted to split the receiver light beam 108 into first and second receiver beams 108A and 108B with orthogonal polarisations. The first receiver beam 108A is directed towards the first receiver detector 46A while the second receiver beam 1108B is directed towards the second receiver detector 46B.

Figure 5:
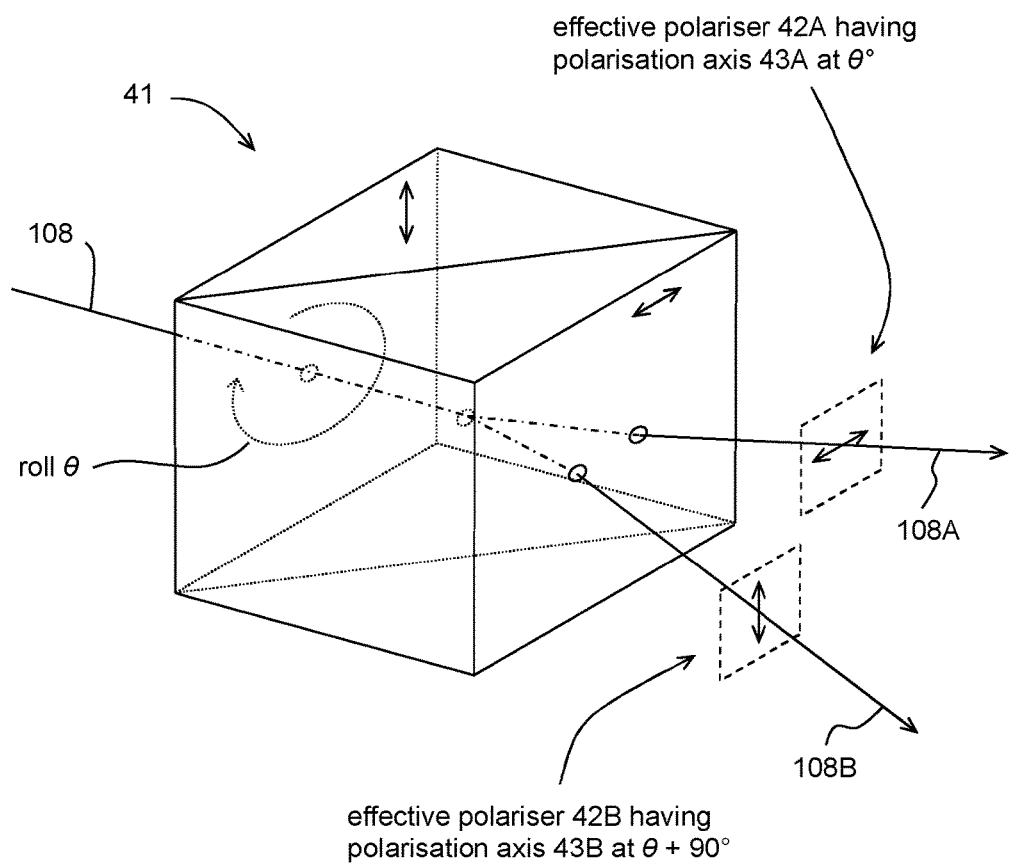
FIG. 5 is a schematic illustration of a Wollaston polariser, as an example of an arrangement for providing different relative orientations between a polarisation axis of a polariser and a polarisation direction of polarised light which is incident upon the polariser.

The Wollaston polariser 41 is illustrated in more detail in FIG. 5. The Wollaston polariser 41 is a birefringent polariser comprising two triangular calcite prisms with orthogonal crystal axes that are cemented together. At the internal interface, an unpolarized beam splits into two linearly polarized rays which typically leave the polariser 41 at a divergence angle of between 15° and 45° (note that, purely for the sake of simplicity, this divergence angle is shown as being 90° in FIG. 4).

The Wollaston polariser 41 effectively acts as two polarisers in one, and so is effectively able to provide both a first polariser 42A with a first polarisation axis 43A at an angle of θ°, and a second polariser 42B with a second polarisation axis 43B at an angle of (θ+90°). The polarisation of the receiver light beam 108, which is incident upon the Wollaston polariser 41, is resolved along the first polarisation axis 43A to produce the first receiver beam 108A, and simultaneously resolved along the second polarisation axis 43B to produce the second receiver beam 108B.

The Wollaston polariser 41 thereby provides an arrangement which enables the second change mentioned above, that is an arrangement for providing first and second different relative orientations between a polarisation axis of the polariser 41 and a polarisation direction of the polarised light, thereby correspondingly providing first and second different output signals from the first and second receiver detectors 46A, 46B.

The third processor 48C is operable to detect rotation of the Wollaston polariser 41 relative to the decohered beam from the beam source 6 based on a difference between the first and second output signals from the first and second receiver detectors 46A, 46B (via the first and second processors 46A, 48B). The signal processing performed by the processors 48A, 48B, 48C will now be described in more detail.

With the arrangement shown in FIG. 4, the first and second processors 48A, 48B are provided respectively as part of the first and second detector units 44A, 44B, and operate in the same way as in the previous scheme described in WO 2008/122808. That is, a difference between the intensities of the first and second beam portions (derived from the first and second sources 20, 22) is first formed by the first and second processors 48A, 48B (corresponding respectively to the two different relative orientations between a polarisation axis of the polariser 41 and a polarisation direction of the polarised light). Then the difference between the two signals from the first and second processors 48A, 48B is formed by the third processor 48C.

Figure 6A:
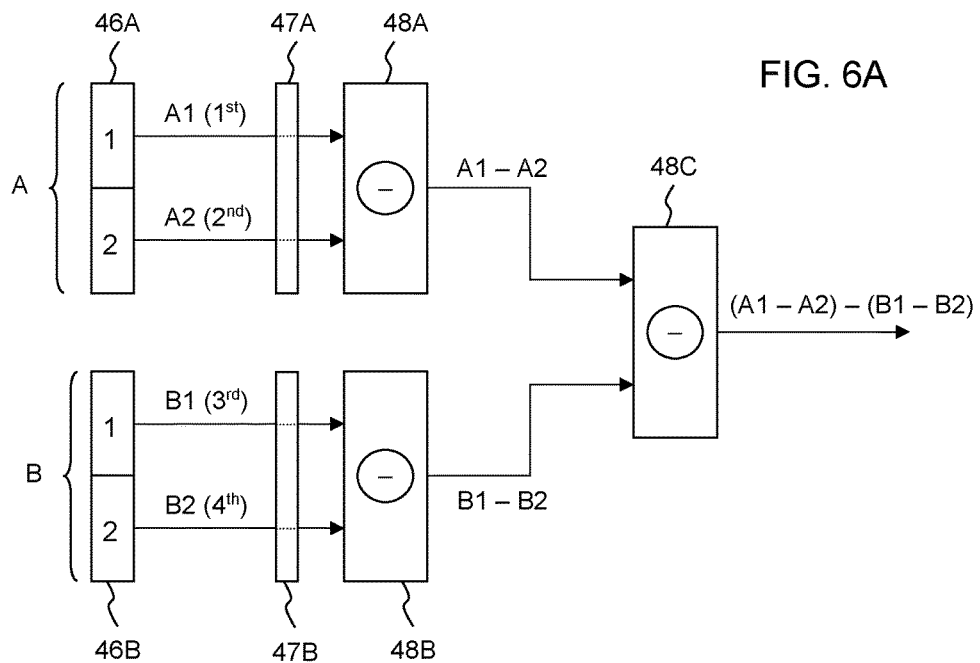
FIGS. 6A and 6B illustrate two different signal processing schemes that can be used in an embodiment of the present invention.

This signal processing scheme is illustrated schematically in FIG. 6A. Two branches A and B are depicted, corresponding respectively to first and second different orientations of the polarisation axis 43A, 43B illustrated in FIG. 5 which produce the first and second receiver beams 108A and 108B.

The first receiver detector 46A is located in branch A, within the first receiver beam 108A incident thereupon. The first receiver detector 46A is illustrated schematically in FIG. 6A as having two parts 1 and 2; these correspond respectively to the first and second beam portions (derived from the first and second sources 20, 22) within the first receiver beam 108A; these two beam portions are spaced apart from one another temporally and received by the first receiver detector 46A one after the other. The first receiver detector 46A outputs a first signal A1 in dependence upon the intensity of light which is incident thereupon from the first beam portion of the first receiver beam 108A, and a second signal A2 in dependence upon the intensity of light which is incident thereupon from the second beam portion of the first receiver beam 108A.

Similarly, the second receiver detector 46B is located in branch B, within the second receiver beam 108B incident thereupon. The second receiver detector 46B is again illustrated schematically in FIG. 6A as having two parts 1 and 2; these correspond respectively to the first and second beam portions (derived from the first and second sources 20, 22) within the second receiver beam 108B; these two beam portions are spaced apart from one another temporally and received by the second receiver detector 46B one after the other. The second receiver detector 46B outputs a third signal B1 in dependence upon the intensity of light which is incident thereupon from the first beam portion of the second receiver beam 108B, and a fourth signal B2 in dependence upon the intensity of light which is incident thereupon from the second beam portion of the second receiver beam 108B.

The first processor 48A is arranged to receive the first and second signals A1, A2 from the first receiver detector 46A, and to determine and to output a signal in dependence upon the difference between those signals, which is shown as (A1−A2). The output signal from the first processor 48A corresponds to expression (26) above, for the second branch A.

Likewise, the second processor 48B is arranged to receive the third and fourth signals B1, B2 from the second receiver detector 46B, and to determine and to output a signal in dependence upon the difference between those signals, which is shown as (B1−B2). The output signal from the second processor 48B corresponds to expression (26) above, for the second branch B.

The third processor 48C is arranged to receive the output signals from the first and second processors 48A, 48B, and to determine and to output a signal in dependence upon the difference between those signals, which is shown as (A1−A2)−(B1−B2).

The output signal from the third processor 48C is fed to the computer 80 as previously. The output signal from the third processor 48C corresponds to expression (38) above.

Note that because of the slight differences in the electronic gains in the first and second receiver detectors 46A, 46B, and as well as the difference in transmission of the two beams through the Wollaston polariser 41 (to produce beams 108A and 108B for the first and second branches A, B), it is desirable to scale the two signals appropriately before differencing them with the third processor 48C. The scaling is performed by variable gain stages 47A and 47B illustrated in FIG. 6A (these would also be present in FIG. 4, but are not shown there for simplicity). The scale factor can be determined online by slightly varying the intensity of one of the sources 20, 22. The relationship between the two differences signals for any value of the 'zero point' term (which is varied by varying the intensity of one of the sources 20, 22) is linear and the slope is the desired scaling factor.

Figure 6B:
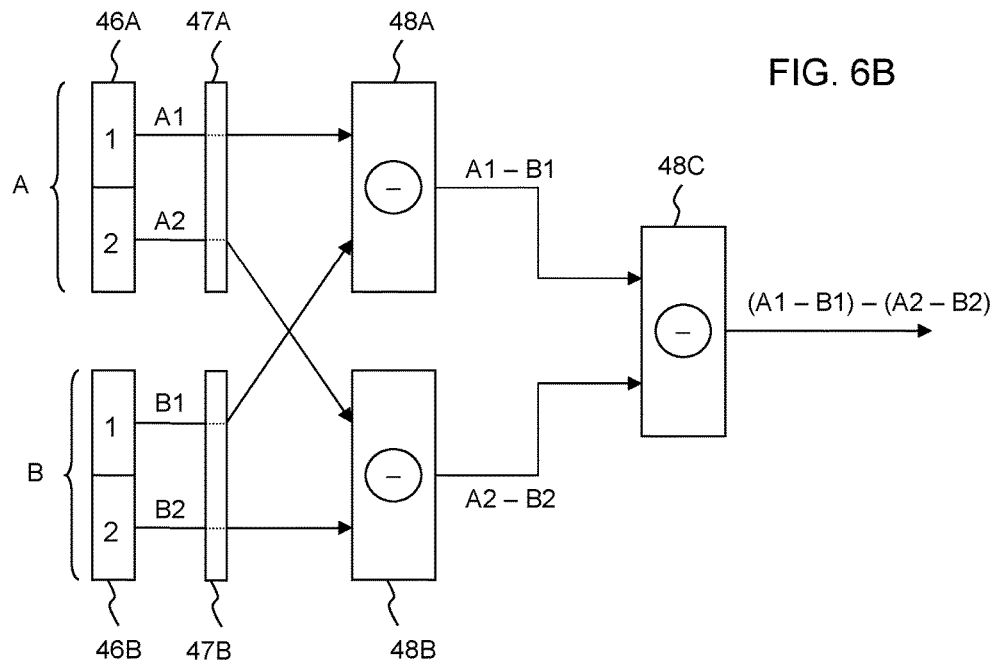

An alternative signal processing scheme to that of FIG. 6A is illustrated in FIG. 6B. As is illustrated, the second signal A2 is fed to the first input of the second processor 48B rather than to the second input of the first processor 48A, and the third signal B1 is fed to the second input of the first processor 48A rather than to the first input of the second processor 48B.

Because of this re-arrangement, the first processor 48A is no longer associated exclusively with the first receiver detector 46A, and therefore is no longer logically part of the first detector unit 44A; it may instead be considered as being separate from the first detector unit 44A. Likewise, the second processor 48B is no longer associated exclusively with the second receiver detector 46B, and therefore is no longer logically part of the second detector unit 44B; it may instead be considered as being separate from the first detector unit 44B.

The above re-arrangement results in a signal relating to (A1−B1) being output from the first processor 48A (which relates to the difference between the intensity of the first beam portion measured by the two detectors 46A and 46B) and a signal relating to (A2−B2) being output from the second processor 48B (which relates to the difference between the intensity of the second beam portion measured by the two detectors 46A and 46B).

The output from the third processor relates to (A1−B1)−(A2−B2), which is of course just the same as the output from the first signal processing scheme of FIG. 6A.

Again, because of the slight differences in the electronic gains in the first and second receiver detectors 46A, 46B, and as well as the difference in transmission of the two beams through the Wollaston polariser 41, the signals A1/A2 and B1/B2 from the two detectors 46A, 46B are each (or at least one) preferably fed to variable gain stages 47A, 47B before being fed to processors 48A, 48B. Again, for the same reasons mentioned previously, the variable gain stages are preferably appropriately adjusted in order to produce a correct scaling factor before differencing the two receivers detectors 46A, 46B in a similar way to that described in the first signal processing scheme.

The procedures which can be performed online in order to adjust at least one of the variable gains appropriately in the FIG. 6B signal processing scheme will now be described in more detail.

Assuming the phase terms are negligible, the electronic signals from the two detectors are given by:

$$S_A = G_A(Z+R) \tag{50}$$

$$S_B = G_B(Z-R) \tag{51}$$

where $G_A$ and $G_B$ are the resultant gains which contain the transmission of the Wollaston polarizer 41, any fixed electronic gains and the adjustable gain from the stages 48A and 48B. The difference signal is then given by:

$$S_A - S_B = (G_A - G_B)Z + (G_A + G_B)R \tag{52}$$

The aim is to alter one or both of the gains $G_A$ and $G_B$ to make the Z term on the right hand side as small as possible, i.e. to make $(G_A - G_B)$ as close as possible to zero. One can proceed in several ways, including:

(1) By varying the power of the sources 20, 22 such that the roll term is constant but the zero point term changes, one can act on at least one of the gains to reduce the variation of the difference signal or make it negligible. This will ensure that the gains are set appropriately, to achieve the above aim and to ensure that drift is no longer significant.

(2) By mechanically ensuring that the roll term is as small as possible, one can vary the power of at least one of the sources 20, 22 and act on the gains to reduce the variation of the difference or make it negligible.

Note also that this scheme can be made equivalent to the previous scheme in the following manner:

If the difference signal $S_A - S_B$ is measured for two values of the gain $G_A$ at fixed value of the gain $G_B$ and for two values of the gain $G_B$ at fixed value of the gain $G_A$, the following four signals are obtained:

$$S_1 = S_{A1} - S_B = G_{A1}(Z+R) - G_B(Z-R) \tag{53}$$

$$S_2 = S_{A2} - S_B = G_{A2}(Z+R) - G_B(Z-R) \tag{54}$$

$$S_3 = S_A - S_{B1} = G_A(Z+R) - G_{B1}(Z-R) \tag{55}$$

$$S_4 = S_A - S_{B2} = G_A(Z+R) - G_{B2}(Z-R) \tag{56}$$

From these, the following two signals can be obtained:

$$S_1 - S_2 = (G_{A1} - G_{A2})(Z+R) \tag{57}$$

$$S_3 - S_4 = (G_{B2} - G_{B1})(Z-R) \tag{58}$$

which are proportional to the signals $S_A$ and $S_B$. In this manner, this scheme will reduce to the previous scheme presented in this application and the same methods described previously can be applied. Note that if one of the gains $G_{A1}$ or $G_{A2}$ is zero, the difference signal is directly proportional to $S_A$. This also applies for detector B.

Whilst the first, second and third processors 48A, 48B, 48C are illustrated as being separate functional units, they can be considered as a single functional processing unit, and may even be combined physically into a single processing unit, in the first scheme or the second scheme. It will also be appreciated that the processing performed by one of more of the processors 48A, 48B, 48C described above can be done in software or in hardware. The processors may be implemented as difference amplifiers. It will similarly be appreciated that the variable gain stages 47A, 47B can be implemented in hardware or software, and rather than being separate and positioned as indicated in FIGS. 6A and 6B they can be incorporated into the processing performed by one or more of the processors 48A, 48B, 48C.

The signal processing scheme of FIG. 6B can be simpler and more power and space efficient to implement than the signal processing scheme of FIG. 6A. If implemented in hardware, the electronics which measure the difference between the two sources would typically be relatively demanding in terms of power consumption, and the signal processing scheme of FIG. 6B uses a single set of them (in processor 48C) rather than two sets as in the signal processing scheme of FIG. 6A (in processors 48A and 48B). If the processors are general purpose processors acting on program instructions then the above-described advantages of the second scheme compared to the first scheme would be less applicable.

Although a Wollaston polariser 41 is described above, another type of similar polarising beam splitter may instead be used, such as a Rochon or Sénarmont prism, a thin film polarising beam splitter, or anything else.

In addition, it will also be appreciated that the Wollaston polariser 41 is provided merely as one example of an arrangement for providing first and second different relative orientations between a polarisation axis of the polariser and a polarisation direction of the polarised light, thereby correspondingly providing first and second different output signals from the detector (in this example, the detector comprises two separate detectors 46A, 46B but this need not be the case in other implementations).

For example, the arrangement for providing the first and second different relative orientations could instead (as mentioned previously) be implemented by providing an arrangement in the beam source 6 for rotating the polarisations of the first and second sources 20, 21, with a normal polariser 42 (such as that described with reference to FIG. 2) in place of the Wollaston (or similar) polariser 41. In such a case, there would only be a need for a single physical detector 46, which would provide signals relating to the two different polarisation orientations at different respective times rather than simultaneously.

In order to implement the first change mentioned above, a 'decohering' arrangement is provided (e.g. in the beam source 6), which in the context of an embodiment of the present invention is an arrangement which is intended to eliminate or at least reduce the coherence between the main and secondary (first and second independent) polarisation components of the polarised light, to produce a 'decohered' (or processed) beam of polarised light. In the FIG. 4 arrangement, the receiver light beam 108 can be considered to be the decohered beam of polarised light.

The decohering arrangement can take many forms, but in the embodiment illustrated in FIG. 4 a decohering arrangement in the form of a birefringent crystal 39 (also referred to herein more generally as decohering element 39) is introduced as the final optical element in the optical path of the receiver light beam 108 before it emerges from the beam source 6. It will be appreciated that the decohering element 39 need not be the final optical element in the optical path of the receiver light beam 108 before it emerges from the beam source 6, but it is at least preferably located after the main sources of non-ideal behaviour described above. In other words, it is preferable that any optical components located in the path of the decohered beam of polarised light, i.e. between the decohering element 39 and the polariser (the Wollaston polariser 41 if the second change is being implemented, or the second, standard, polariser 42 if not) do not introduce substantial drift.

A birefringent crystal has a particular axis (called the optic axis or crystal axis) along which the refractive index is different from that of the other two orthogonal axes. Thus a linearly polarised light in the direction of the crystal axis experiences a different path length when it propagates inside the crystal to a linearly polarised light in a direction orthogonal to the crystal axis. Thus for a generally polarised light propagating inside the crystal the orthogonal components along the crystal axis and the direction perpendicular to the crystal axis would experience a phase shift. If the propagation length is long enough (i.e. the crystal is thick enough) as to produce a path length difference much larger than the coherence length of the source, then the phase terms would average to zero, as explained above. A broadband light source can be used for each of the first and second sources 20, 22 in order to reduce the coherence length. The axes of the crystal are roughly aligned to the axes of the polarisation maintaining optical fibre 30 (and hence roughly aligned to the two sources 20, 22) and they provide a mechanical reference against which the roll can be measured.

Other implementations of the decohering arrangement are possible for elimination or at least reduction of the interference term. As will be apparent from the previous explanations of the interference term, the concept of the decohering arrangement is very similar to the concept of coherence in interferometry: if a beam is split into two paths (two arms of an interferometer, for example) and then recombined, interference fringes will be observed provided that the difference in optical path length is less than the coherence length of the source. If the goal is to eliminate these fringes then this can be done in several ways including:

1. Spectral Domain: The coherence length of a source is inversely proportional to its spectral bandwidth and thus if a broadband source such as a superluminescent light emitting diode (SLED) is used which produces a coherence length much less than the optical path difference between the two paths, fringes will not be observed. A narrow band source could also be used, with its wavelength modulated sufficiently fast (i.e. faster than the observation time) and over a similar bandwidth to the required broadband source.

2. Temporal Domain: If a narrow band source is used but instead the path length in one of the arms of the interferometer is modulated sufficiently fast, then the interference will be smeared and this will produce the desired effect.

3. Spatial Domain: If in one arm of the interferometer is inserted a spatial light modulator which produces different path lengths at different points of the beam width, then the average of the interference over the beam width would be zero. Or in other words, the spatial coherence of the source could be reduced.

All these methods suitable for use as the decohering arrangement fall into a broader way of achieving the elimination of the interference term: the phase shift between the two paths depends on some parameter and the interference term averaged over the values of this parameter is zero.

The analogy to the phase term in the roll measurement is as follows: an elliptic polarisation is described by two orthogonal components which are oscillating with a certain phase shift between them: if the phase shift is zero or $\pi$ then the polarisation is linear but for any other phase values the polarisation is elliptic in general. Then when this polarisation is passed through a polariser whose direction is somewhere between the two orthogonal directions, there is an interference term which is related to the phase shift between the two orthogonal components. In other words the two orthogonal components are analogous to the two interfering beams and the phase shift between them is analogous to the path length difference. Thus similar techniques could be used to eliminate this interference term, and all would fall within the term 'decohering arrangement' used herein.

In particular, the decohering arrangement is described above with reference to FIG. 4 as being in the form of a birefringent crystal 39. However, it will be appreciated that the decohering arrangement can more generally comprise birefringent material other than in the form of a crystal. For example, an optical fibre comprising birefringent material can act as the decohering arrangement.

A further change compared with the system of WO 2008/122808 is that the control polariser 34 is not required. It can be retained, but it can be considered to be redundant when the decohering element 39 is implemented since the decohering element 39 provides a mechanical reference instead of the control polariser 34; retaining the control polariser 34 would generally only serve to introduce unnecessary drift.

As mentioned previously, it will be appreciated that the first change mentioned above (to introduce a decohering arrangement) can be implemented without also implementing the second change mentioned above (to introduce polarisation rotation), and vice versa. If the first change is implemented without the second change, then the receiver unit 8 of FIG. 4 can effectively be replaced by the receiver unit 8 of FIG. 2, with a single detector unit 44 in the receiver unit 8. If the second change is implemented without the first change, then the beam source 6 of FIG. 4 can effectively be replaced by the beam source 6 of FIG. 2, without the decohering element 39.

Also as mentioned above, some benefit will be achieved with the decohering arrangement even with a single source generating light of a single polarisation (i.e. without the first and second beam portions described above); such an arrangement would be based on expression (16) above rather than expression (24).

It should be mentioned that, where first and second beam portions having first and second different respective polarisation states are employed, rather than having two separate sources 20, 22 to generate the first and second beam portions as shown in FIG. 4, a single light source can also be used which is split into orthogonal polarisation paths which are chopped alternatively (for example using an electro optical modulator or EOM) and then recombined and coupled to the polarisation maintaining optical fibre 30.

Furthermore, the receiver detector(s) 46, and associated processors 48, could be located in the beam source 6 rather than in the receiver unit 8; this is because it is the relative rotation between the beam source 6 and the polariser 41 which matters, and the polariser 41 is retained in the receiver unit 8. (If the decohering element 39 is implemented, what matters is the relative rotation between the decohering element 39 and the polariser 41; as described below, the decohering element 39 need not be provided in the beam source 6.) An alternative scheme in which the receiver detector(s) 46 are in the beam source 6 will be readily apparent from a consideration of FIG. 5 of WO 2008/122808.

It will also be appreciated that the other variations described in relation to FIG. 6 onwards in WO 2008/122808 (particularly but not exclusively the variations relating to measurement of pitch and yaw in FIGS. 11 and 12) are equally applicable to an embodiment of the present invention, and those variations are incorporated herein by reference. Further details of such a system in which the receiver is configured to determine the degree of pitch and yaw are disclosed in WO 2008/122816, the entire content of which is incorporated into this specification by this reference.

The scheme described above with reference to FIG. 4 (in conjunction with FIG. 1) consists of two main components: the beam source 6 and the receiver unit 8 (the receiver unit 8 being mounted on the quill 18 of the CMM 4), with the decohering element 39 located in the beam source 6 and the Wollaston polariser 41, detectors 46A, 46B and associated processors 48A, 48B and 48C being in the receiver unit 8.

Figure 7:
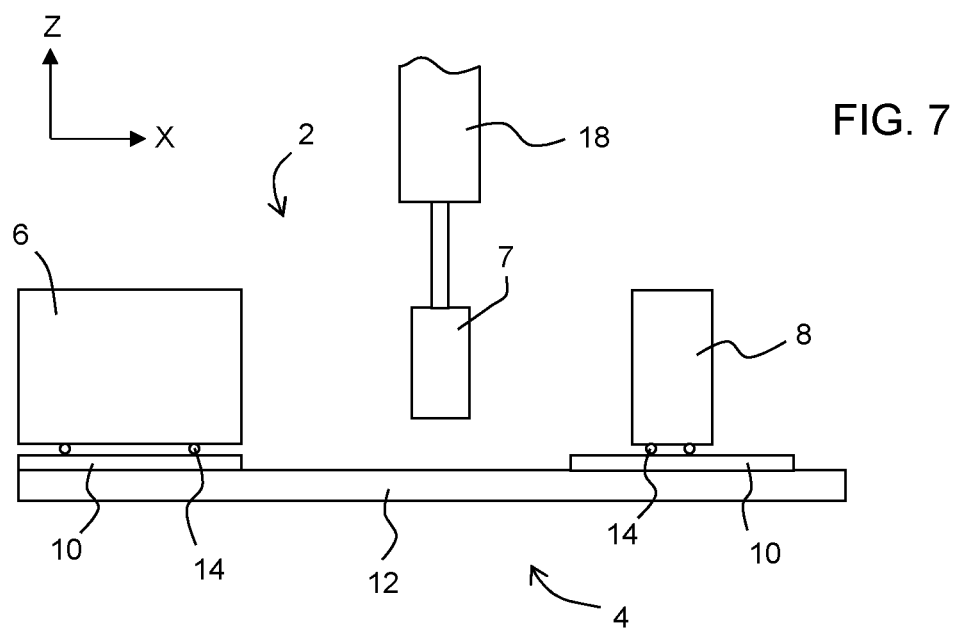
FIG. 7 is a schematic illustration of a rotation detection apparatus according to an alternative embodiment of the present invention.

It is also possible to implement the scheme in a manner as illustrated schematically in FIG. 7, which the decohering element 39 is moved from the beam source 6 into an intermediate unit 7 that is mounted on the quill 18 of the CMM 4. The receiver unit 8 (with Wollaston polariser 41, detectors 46A, 46B and associated processors 48A, 48B and 48C) is arranged in a fixed position beyond the intermediate unit 7. The intermediate unit 7 is arranged between the beam source 6 and the receiver unit 8, so that the decohering element 39 therein is in the path of the receiver light beam 108 emitted from the beam source 6. The Wollaston polariser 41, detectors 46A, 46B and associated processors 48A, 48B and 48C in the receiver unit 8 can be arranged and operated as described above with reference to FIG. 4.

In general, therefore, it is rotation of the polariser 41, 42 relative to the decohered beam of polarised light (i.e. the beam resulting from the action of the decohering arrangement, whether by a decohering element 39 or by rotation means in the beam source 6) that results in a variation of the intensity of light incident upon the detector 46A, 46B, 46, and a corresponding variation in the signal output from the detector 46A, 46B, 46 that is the basis for a determination by the processor 48A, 48B, 48C, 48 of the rotation of the polariser relative to the decohered beam of polarised light.

The arrangement of FIG. 7 can be altered further by locating the elements of the receiver unit 8 in the beam source 6, with the receiver light beam 108 being "folded" or reflected by a reflective element in the intermediate unit 7 (as per FIG. 5 of WO 2008/122808), with the reflective element located either before or after the decohering element 39.

These arrangements described with reference to FIG. 7 have the advantage of a passive quill (intermediate) unit 7 with only a small number of elements therein.

The first of the two arrangements described with reference to FIG. 7 can be considered to be preferable to the second, since movements of the beam on the Wollaston polariser 41 and detectors 46A, 46B in the first arrangement are small compared to those in the second arrangement. This has the advantage of eliminating potential problems due to spatial variations from the Wollaston polariser 41 and detectors 46A, 46B. However these variations are greatly reduced by employing two sources 20, 22 of substantially similar wavelengths; if the two beams from the two sources 20, 22 are perfectly overlapped, these variations would be negligible.

It is described above that the 'zero point' term of expression (28) can be combated by way of introducing a rotation of polarisation as explained with reference to expressions (31) to (37). An alternative approach to combating the zero point term makes use of a semi-transparent detector, which like a normal detector is placed in the path of a beam of light for outputting a signal which is dependent upon the intensity of light falling upon it, but which unlike a normal detector allows at least a proportion of light to pass through it.

Such a semi-transparent detector can be used in at least the following two ways to eliminate or at least reduce the zero point term.

In a first implementation, the semi-transparent detector would replace the beam splitter 32, control polariser 34 and control detector 36 of FIG. 2, with the semi-transparent detector acting instead as the control detector. The semi-transparent detector would preferably be the last optic in the beam source 6, in the path of the receiver beam 108 before it leaves the beam source 6, i.e. in the position of the beam splitter 32 of FIG. 2. If a decohering element is also being used as described herein above, if the semi-transparent detector does not introduce phase shifts, then it can be put after the decohering element; if the decohering element does not introduce drift to the zero term then it can be put after the semi-transparent detector. It is to be recalled, with reference to expression (28), that zero point term is the difference between the intensities of the two sources 20, 22 (or of the first and second beam portions derived respectively from the first and second sources 20, 22) just before the polariser 42, and that the control unit 38 attempts to equalise the signals derived from the two sources 20, 22. Therefore, such an arrangement using a semi-transparent detector would keep the zero point term close to zero (provided that the differential response of the semi-transparent detector with respect to the two sources 20, 22 does not drift significantly).

In a second implementation, the beam source 6 can be left as it is in FIG. 2, with the semi-transparent detector being provided in the receiver unit 8 before the polariser 42. The semi-transparent detector can be arranged to measure the difference and sum of the intensities from the two sources 20, 22 and (provided that the differential response of the semi-transparent detector with respect to the two sources 20, 22 does not drift significantly) this can be used to determine the zero point term, which can then be subtracted from the signal from the detector 46 by the processor 48. The zero point term can be derived from the sum and difference of the intensities based on the difference divided by the sum. The matching of the gains between the two detectors can be performed using a technique analogous to that described above with reference to FIG. 6A (changing the intensity of one of the sources and obtaining the gradient of the resulting curve).

A semi-transparent detector arrangement in the context of an embodiment of the present invention can be considered to be an opto-electronic system comprising either a detector which is itself semi-transparent or an optical arrangement comprising a semi-transparent component which is arranged to direct light onto a non-transparent detector. Furthermore, in the context of an embodiment of the present invention, the opto-electronic system should preferably satisfy all of the following conditions:
(a) Light from the two sources (the first and second beam portions) is incident on an input port of the opto-electronic system.
(b) At least part of the incident light exits the system at an output port of the opto-electronic system.
(c) The system provides a signal which is a substantially linear function of the difference between the intensities of the two sources (first and second beam portions) at the output port.
(d) The offset term of the function referred to in condition (c) should preferably not drift significantly with environmental conditions and/or the wavelength of the sources. However, if there is any such drift, the system should be adapted to measure the offset and to adjust its output signal to counteract the effect of the offset (e.g. by subtracting it). The offset term can be considered to be a part of the function that does not depend on the intensity difference (but which may depend on other factors, such as environmental factors like operating temperature).

Preferably, the system should also satisfy one or both of the following conditions:
(e) The system also provides a signal proportional to a sum of the two intensities.
(f) The output polarisation is composed of incoherent linear components whose respective directions are fixed either with respect to the input polarisation or to a reference axis within the semi-transparent detector. If, however, a phase shift between two polarisation components is introduced by the semi-transparent detector, then the phase term resulting from this phase shift should not drift significantly.

In view of the above conditions, a beam splitter and a non-transparent detector is typically not considered to be a "semi-transparent detector arrangement" in the context of an embodiment of the present invention, since a beam splitter does not in practice typically satisfy condition (d): even if the function of the difference is linear it would typically have a drifting offset term. Also it does not typically satisfy condition (f), since the phase term introduced does typically drift.

The above condition (c)—that the signal is a substantially linear function of the difference between the intensities of the two sources—will now be discussed in more detail.

From expression (27), it can be seen that the roll signal S is composed of contributions from Z (the zero-point term, which is I1–I2), the phase-shifts term P, and the physical roll R, as follows: $S=Z+P+R$.

Since the goal is to counteract Z, as described above it is desirable that a signal is provided from the semi-transparent arrangement which is a substantially linear function of Z, with the offset term of this function being either non-drifting or drifting and compensated for, so that the signal can simply be subtracted from the roll signal S to eliminate (or at least reduce the effect of) the zero-point term Z.

However, it will be appreciated that the substantially linear nature of the signal provided by the semi-transparent detector arrangement need not be achieved entirely by the actual response of the detector (and closely associated electronics) within the semi-transparent detector arrangement. If the physical response of any part of the semi-transparent detector arrangement contributes to a non-linear function of Z, the semi-transparent detector arrangement would be configured to perform further processing which effectively linearises the response, thereby effectively extracting a linear function of Z which can be used to eliminate or reduce the effect of the zero-point term. Such processing could be performed by a dedicated processor provided as part of the semi-transparent detector arrangement, or it could be performed by the processor 48 which is already provided to determine the roll signal. The semi-transparent detector arrangement can therefore, in some embodiments, comprise the processor 48, with the function of the semi-transparent detector arrangement being combined with and inseparable from the function of the processor 48. The processing performed by the processor 48 to linearise (if necessary) the function may be combined with the processing performed by the processor 48 to determine the roll signal, so that the two are performed as one.

The invention claimed is:
1. A rotation detection apparatus comprising:
   a beam source for emitting a beam of polarised light;
   a decohering arrangement for eliminating or at least reducing the degree of coherence between first and second independent polarisation components of the beam of polarised light to produce a decohered beam of polarised light;
   a detector for outputting a signal in dependence on the intensity of light which is incident thereupon, the detector being arranged so that the decohered beam of polarised light is incident upon it;
   a polariser located in the path of the decohered beam of polarised light such that rotation of the polariser relative to the decohered beam of polarised light results in a variation of the intensity of light incident upon the detector from the beam source and a corresponding variation in the signal output from the detector; and
   a processor for detecting the relative rotation based on the variation of the signal output from the detector.
2. A rotation detection apparatus as claimed in claim 1, wherein the beam of polarised light comprises first and second beam portions having first and second different respective polarisation states, thereby correspondingly providing first and second different output signals from the detector, and wherein the processor is operable to detect the relative rotation based on a difference between the first and second output signals from the detector.

3. A rotation detection apparatus as claimed in claim 2, wherein the first and second beam portions are temporally spaced with respect to one another.

4. A rotation detection apparatus as claimed in claim 2, wherein the beam source comprises first and second different light sources for emitting the first and second beam portions respectively.

5. A rotation detection apparatus as claimed in claim 2, wherein the detector comprises a single detector for providing the first and second different output signals.

6. A rotation detection apparatus as claimed in claim 1, wherein the apparatus comprises an arrangement for providing first and second different relative orientations between a polarisation axis of the polariser and a polarisation direction of the polarised light, thereby correspondingly providing first and second different output signals from the detector, and wherein the processor is operable to detect the relative rotation based on a difference between the first and second output signals from the detector.

7. A rotation detection apparatus comprising:
a beam source for emitting a beam of polarised light;
a detector for outputting a signal in dependence on the intensity of light which is incident thereupon, the detector being arranged so that the beam of polarised light is incident upon it;
a polariser located in the path of the beam of polarised light such that rotation of the polariser relative to the beam of polarised light results in a variation of the intensity of light incident upon the detector from the beam source and a corresponding variation in the signal output from the detector; and
a processor for detecting the relative rotation based on the variation of the signal output from the detector;
wherein the beam of polarised light comprises first and second beam portions having first and second different respective polarisation states;
wherein the apparatus comprises an arrangement for providing, for each of the first and second beam portions, first and second different relative orientations between a polarisation axis of the polariser and a polarisation direction of the polarised light of that beam portion, thereby correspondingly providing first to fourth different output signals from the detector relating respectively to: (1) the first relative orientation for the first beam portion; (2) the first relative orientation for the second beam portion; (3) the second relative orientation for the first beam portion; and (4) the second relative orientation for the second beam portion;
wherein the processor is operable to detect the relative rotation based on the first to fourth output signals from the detector; and
wherein the processor is operable to derive first and second values from the first to fourth output signals, and to detect the relative rotation based on a difference between the first and second values, wherein the first and second values are based respectively on (i) a difference between the first and second output signals and a difference between the third and fourth output signals; or (ii) a difference between the first and third output signals and a difference between the second and fourth output signals.

8. A rotation detection apparatus as claimed in claim 7, comprising a variable gain stage for scaling the output signals and/or the difference values associated with one of the first and second different relative orientations relative to the output signals and/or the difference values associated with other of the first and second different relative orientations.

9. A rotation detection apparatus as claimed in claim 6, wherein the polariser forms part of the arrangement for providing the first and second different relative orientations.

10. A rotation detection apparatus as claimed in claim 9, wherein the polariser comprises a polarising beam splitter for providing the first and second different relative orientations.

11. A rotation detection apparatus as claimed in claim 6, wherein the detector comprises first and second different detectors for providing the output signals relating respectively to the first and second different relative orientations.

12. A rotation detection apparatus as claimed in claim 6, wherein the arrangement for providing the first and second different relative orientations comprises means for rotating the beam of polarised light to provide the first and second different relative orientations.

13. A rotation detection apparatus comprising:
a beam source for emitting a beam of polarised light;
a detector for outputting a signal in dependence on the intensity of light which is incident thereupon, the detector being arranged so that the beam of polarised light is incident upon it;
a polariser located in the path of the beam of polarised light such that rotation of the polariser relative to the beam of polarised light results in a variation of the intensity of light incident upon the detector from the beam source and a corresponding variation in the signal output from the detector; and
a processor for detecting the relative rotation based on the variation of the signal output from the detector;
wherein the beam of polarised light comprises first and second beam portions having first and second different respective polarisation states, thereby correspondingly providing first and second different output signals from the detector, and wherein the processor is operable to detect the relative rotation based on a difference between the first and second output signals from the detector; and
wherein the apparatus comprises a semi-transparent detector arrangement located in the path of the beam of polarised light before the polariser, such that the first and second beam portions are incident upon the arrangement and at least part of the incident light passes through the arrangement, the arrangement being adapted and arranged to influence the detection of relative rotation by the processor as a substantially linear function of the difference between the intensities of the first and second beam portions received at the arrangement, wherein the arrangement is adapted to measure an offset term of the function and to adjust the influence provided by the arrangement to counteract the effect of the offset term, and/or wherein the offset term does not drift significantly with environmental conditions and/or the wavelength of the first and second beam portions.

14. A rotation detection apparatus as claimed in claim 13, wherein the arrangement is adapted to provide a signal which is a substantially linear function of the difference between the intensities of the first and second beam portions, and wherein the signal provided by the arrangement is arranged to influence the detection of relative rotation by the processor.

15. A rotation detection apparatus as claimed in claim 14, comprising a control unit which is operable to control the relative intensities of the first and second beam portions in dependence upon the signal provided by the arrangement.

16. A rotation detection apparatus as claimed in claim 14, wherein the processor is operable to detect the relative rotation in dependence upon the signal provided by the arrangement.

17. A rotation detection apparatus as claimed in claim 7, further comprising a decohering arrangement for eliminating or at least reducing the degree of coherence between first and second independent polarisation components of the polarised light from the beam source to produce a decohered beam of polarised light that is incident on the detector via the polariser, such that the relative rotation detected by the processor is between the polariser and the decohered beam of polarised light.

18. A rotation detection apparatus as claimed in claim 1, wherein the decohering arrangement comprises a birefringement material located in the path of the beam of polarised light.

19. A rotation detection apparatus as claimed in claim 1, wherein the detecting of the relative rotation by the processor comprises determining a measure of the relative rotation.

\* \* \* \* \*